(12) United States Patent
Reynolds

(10) Patent No.: US 11,378,989 B2
(45) Date of Patent: Jul. 5, 2022

(54) HYDRAULIC VALVE WITH SWITCHING REGENERATION CIRCUIT

(71) Applicant: Parker-Hannifin Corporation, Cleveland, OH (US)

(72) Inventor: Dennis L. Reynolds, Ft. Wayne, IN (US)

(73) Assignee: Parker-Hannifin Corporation, Cleveland, OH (US)

( * ) Notice: Subject to any disclaimer, the term of this patent is extended or adjusted under 35 U.S.C. 154(b) by 144 days.

(21) Appl. No.: 16/415,601

(22) Filed: May 17, 2019

(65) Prior Publication Data

US 2019/0271993 A1 Sep. 5, 2019

Related U.S. Application Data

(63) Continuation of application No. PCT/US2017/062746, filed on Nov. 21, 2017.
(Continued)

(51) Int. Cl.
*F15B 13/02* (2006.01)
*F16K 11/00* (2006.01)
(Continued)

(52) U.S. Cl.
CPC ....... *G05D 16/2024* (2019.01); *E02F 9/2267* (2013.01); *F15B 13/021* (2013.01);
(Continued)

(58) Field of Classification Search
CPC .... F16K 11/065; F15B 13/021; F15B 13/025; F15B 13/027; F15B 13/0402
See application file for complete search history.

(56) References Cited

U.S. PATENT DOCUMENTS

| 5,862,831 A | 1/1999 | Chung et al. |
| 7,337,807 B2 | 3/2008 | Koo et al. |

(Continued)

FOREIGN PATENT DOCUMENTS

| JP | H02134401 | 5/1990 |
| JP | H0581509 | 11/1993 |

(Continued)

OTHER PUBLICATIONS

PCT/US2017/062746; PCT International Search Report and Written Opinion of the International Searching Authority dated Mar. 13, 2018.

(Continued)

*Primary Examiner* — Kelsey E Cary

(74) *Attorney, Agent, or Firm* — Renner, Otto, Boisselle & Sklar, LLP

(57) ABSTRACT

A hydraulic valve assembly having a regeneration circuit, where the hydraulic valve assembly is switchable between a regenerative mode and a non-regenerative mode as the valve assembly supplies fluid to operate a hydraulic device. The hydraulic valve assembly may be automatically switchable between the regenerative mode and the non-regenerative mode, such as by utilizing a pressure control valve in the hydraulic circuit that is activatable at a predetermined pressure setpoint, or by utilizing a variable pressure reducing valve that actuates a spool in the hydraulic circuit. In other (Continued)

embodiments, the hydraulic valve assembly may be manually switchable between the regenerative mode and non-regenerative mode by utilizing a valve member operatively coupled to a solenoid in cooperation with one or more check valves in the regeneration circuit.

16 Claims, 10 Drawing Sheets

Related U.S. Application Data

(60) Provisional application No. 62/425,373, filed on Nov. 22, 2016.

(51) Int. Cl.
| | | |
|---|---|---|
| *G05D 16/20* | (2006.01) | |
| *E02F 9/22* | (2006.01) | |
| *F15B 13/04* | (2006.01) | |
| *F15B 21/14* | (2006.01) | |
| *F16K 11/065* | (2006.01) | |
| *E02F 3/42* | (2006.01) | |

(52) U.S. Cl.
CPC .......... *F15B 13/025* (2013.01); *F15B 13/027* (2013.01); *F15B 13/0402* (2013.01); *F15B 21/14* (2013.01); *F16K 11/065* (2013.01); *E02F 3/422* (2013.01)

(56) References Cited

U.S. PATENT DOCUMENTS

| | | | | |
|---|---|---|---|---|
| 2003/0000373 | A1* | 1/2003 | Weber | F15B 13/021 |
| | | | | 91/446 |
| 2006/0081299 | A1* | 4/2006 | Koo | E02F 9/2217 |
| | | | | 137/625.69 |
| 2009/0101854 | A1* | 4/2009 | Jeon | F15B 13/021 |
| | | | | 251/63 |
| 2016/0251831 | A1* | 9/2016 | Ku | E02F 9/2267 |
| | | | | 60/468 |
| 2017/0350097 | A1* | 12/2017 | Kang | F15B 13/02 |

FOREIGN PATENT DOCUMENTS

| | | |
|---|---|---|
| JP | H09144914 | 6/1997 |
| JP | 2006002918 | 1/2006 |
| WO | 2012129042 | 9/2012 |

OTHER PUBLICATIONS

Parker Hannifin, Catalog HY11-3500/UK dated Apr. 17, 2015 pp. 34-39.

Rexroth Bosch Group Catalog for Flow sharing control block in mono block / sandwich plate design M6-22 dated Dec. 2015 pp. 1-18.

* cited by examiner

HYDRAULIC VALVE WITH SWITCHING REGENERATION CIRCUIT

RELATED APPLICATIONS

This application is a continuation of co-pending International Application No. PCT/US2017/062746 filed Nov. 21, 2017 and published in the English language, which claims the benefit of U.S. Provisional Application No. 62/425,373 filed Nov. 22, 2016, all of which are hereby incorporated herein by reference in their entireties.

FIELD OF INVENTION

The present invention relates generally to a hydraulic system, and more particularly to a hydraulic valve assembly that is switchable between a regenerative mode and a non-regenerative mode when actuating a fluid operated device of a work machine.

BACKGROUND

A hydraulic valve assembly is a device that controls the flow of hydraulic fluid from a pump to one or more movable members in a hydraulic system, such as for use with construction or industrial equipment. Each movable member is controlled by a hydraulic section that includes a valve body having one or more work ports fluidly connected to the movable member, an inlet passage fluidly connected to the pump, and an exhaust passage that may be fluidly connected to a tank or reservoir. A main control spool that is slidably movable in the valve body controls the flow of fluid to and from the different passages or ports. For example, the movement of the control spool can open or close fluid passages that fluidly connect the movable members to the pump and/or reservoir via the work ports. As the valve assembly supplies fluid to one portion of the movable member via one work port, fluid in another portion of the movable member is displaced and returned to the valve assembly via another work port. A valve assembly can include a single section to operate a single movable member, or a plurality of sections to operate a plurality of movable members.

Examples of movable members include single-rod hydraulic cylinders. The single rod cylinder contains two pressurized chambers separated by a piston. The piston has a rod connected to one end, which when disposed in the hydraulic cylinder forms a rod-end chamber and a piston-end chamber. The hydraulic cross-sectional area of the rod-end chamber is smaller than the hydraulic cross-sectional area of the piston-end chamber because of the presence of the rod in the rod-end chamber. When the hydraulic valve assembly directs fluid from the pump inlet passage to the work port that is fluidly connected to the piston-end chamber of the cylinder, the cylinder extends, or gets longer in length. When the cylinder is extended in this way, more fluid is needed to fill the piston-end chamber than is being discharged from the rod-end chamber. Conversely, less fluid is needed to fill the rod-end chamber than is being discharged from the piston-end chamber when the cylinder is being retracted.

One of the methods of controlling fluid flow through the valve assembly to supply such a hydraulic cylinder is an industry accepted hydraulic circuit known as a regeneration circuit. The regeneration circuit allows the hydraulic fluid being displaced from the rod-end chamber of the extending, single-rod hydraulic cylinder to be mixed with the pump flow that is filling the piston-end chamber of the same cylinder. Since the speed of a cylinder to extend the rod depends upon the amount of fluid supplied over a period of time to the piston end, the regeneration circuit makes the piston move faster as compared to a non-regeneration circuit which utilizes only the fluid from the pump. However, the regeneration circuit decreases the amount of usable hydraulic force that the hydraulic cylinder can generate in the extending mode because the usable piston-end hydraulic cross-sectional area is reduced by the cross-sectional area of the rod. For example, because both the piston-end hydraulic cross-sectional area and the rod-end hydraulic cross-sectional area are connected to each other via the regeneration circuit:

Hydraulic Area$_{extend}$=$A_{pn}$−($A_{pn}$−$A_r$) in regen mode, thus:

Hydraulic Area$_{extend}$=$A_r$ in regen mode, where, $A_{pn}$=area of the piston, $A_r$=area of the rod.
Since $A_r$ is less than $A_{pn}$, the regeneration circuit reduces the amount of work, or thrusting force, the hydraulic cylinder can produce. If the hydraulic cylinder is extending and is being influenced more from gravity than the hydraulic fluid being directed to the cylinder, such as when dumping a bucket or lowering a boom, the regeneration circuit is often desirable because it sends more fluid to the cylinder than the pump can provide, and prevents fluid cavitation in the piston-end of the cylinder. In this situation, that the hydraulic cylinder is producing reduced hydraulic thrust is not typically important because the movable function is not encountering any external resistance. However, when the movable function does encounter external resistance, such as the ground, the reduced hydraulic thrust typically becomes undesirable. If the hydraulic valve assembly can switch between activating the regeneration circuit in a regenerative mode and deactivating the regeneration circuit in a non-regenerative mode, then the hydraulic cylinder can produce more hydraulic thrust when desired and more productive work can be accomplished.

SUMMARY OF INVENTION

The present invention provides a hydraulic valve assembly having a regeneration circuit that is switchable between a regenerative mode and a non-regenerative mode as the valve assembly supplies fluid to operate a hydraulic device. Such a hydraulic valve assembly may enable a movable function on a work machine to transition between moving faster, with lower thrusting force, in the regenerative mode, and moving slower, with greater thrusting force, in the non-regenerative mode, all while the movable function is moving in the same direction.

The hydraulic valve assembly may be automatically switchable between the regenerative mode and the non-regenerative mode, such as by utilizing a pressure control valve in the hydraulic circuit that is activatable at a predetermined pressure setpoint. The pressure control valve may be in fluid communication with a work port, and may be activatable based upon the fluid pressure at the work port. The work port may be fluidly connected to a hydraulic cylinder, and the valve assembly may be switchable between the regenerative and non-regenerative modes during the extension of the cylinder.

In other embodiments, the hydraulic valve assembly may be automatically switchable between the regenerative and non-regenerative modes by utilizing a variable pressure reducing valve that actuates a spool in the hydraulic circuit. The variable pressure reducing valve may receive a signal from a controller that is in communication with a sensor that measures fluid pressure associated with a work port. Based upon this measured fluid pressure, the variable pressure reducing valve may command moving the spool in the flow path of the regeneration circuit to enable activation of the regenerative mode or the non-regenerative mode.

In still other embodiments, the hydraulic valve assembly may be manually switchable between the regenerative mode and non-regenerative mode by utilizing a valve member in cooperation with one or more check valves in the regeneration circuit. The valve member may be operatively coupled to a solenoid that can receive a signal from an operator to command moving the valve member in the flow path of the regeneration circuit so as to enable activation of the regenerative mode or the non-regenerative mode.

According to one aspect of the invention, a hydraulic valve assembly for supplying and receiving pressurized fluid from a fluid operated device is provided, the hydraulic valve assembly being switchable between a regenerative mode and a non-regenerative mode, the hydraulic valve assembly including: a valve body having fluid passages forming a fluid flow path, the fluid passages including: an inlet passage for fluidly connecting to a source of pressurized fluid; a work port supply passage fluidly connected to a supply work port for supplying pressurized fluid to the fluid operated device; a work port return passage fluidly connected to a return work port for receiving pressurized fluid from the fluid operated device; a discharge passage for discharging pressurized fluid from the return passage to outside of the valve body; and a regenerative shift passage for fluidly connecting the work port return passage to the work port supply passage in the regenerative mode, and for fluidly connecting the work port return passage to the discharge passage in the non-regenerative mode. The hydraulic valve assembly further including a main control valve extending through at least a portion of the valve body, the main control valve being movable relative to the valve body to control the direction of fluid flow through the valve body; and a pressure control valve disposed in the fluid flow path between the regenerative shift passage and the discharge passage; wherein the pressure control valve is in fluid pressure communication with the return work port, and is configured to activate at a predetermined pressure setpoint; wherein, when fluid pressure at the return work port is less than the predetermined pressure setpoint, the pressure control valve activates the regenerative mode, such that the pressure control valve closes the flow path from the regenerative shift passage to the discharge passage to prevent return work port flow from being discharged from the valve body, and enables opening of the fluid flow path from the regenerative shift passage to the work port supply passage to allow return work port flow to be supplied to the supply work port; and wherein, when fluid pressure at the return work port meets or exceeds the predetermined pressure setpoint, the pressure control valve activates the non-regenerative mode, such that the pressure control valve opens the flow path from the regenerative shift passage to the discharge passage to allow return work port flow to be discharged from the valve body, and enables closing of the fluid flow path from the regenerative shift passage to the work port supply passage to prevent return work port flow from being supplied to the supply work port.

According to another aspect of the invention, a hydraulic valve assembly for supplying and receiving pressurized fluid from a fluid operated device is provided, the hydraulic valve assembly being switchable between a regenerative mode and a non-regenerative mode, the hydraulic valve assembly including: a valve body having fluid passages forming a fluid flow path, the fluid passages including: an inlet passage for fluidly connecting to a source of pressurized fluid; a work port supply passage fluidly connected to a supply work port for supplying pressurized fluid to the fluid operated device; a work port return passage fluidly connected to a return work port for receiving pressurized fluid from the fluid operated device; a discharge passage for discharging pressurized fluid from the return passage to outside of the valve body; a bridge passage for fluidly connecting the work port return passage to the work port supply passage in the regenerative mode; and a regenerative shift passage for fluidly connecting the work port return passage to the discharge passage in the non-regenerative mode. The hydraulic valve assembly further including a main control valve extending through at least a portion of the valve body, the main control valve being movable relative to the valve body to control the direction of fluid flow through the valve body; a spool slidably disposed in the fluid flow path between the regenerative shift passage and the discharge passage, the spool being movable between an open position for permitting fluid flow from the regenerative shift passage to the discharge passage, and a closed position for preventing fluid flow from the regenerative shift passage to the discharge passage; a variable pressure reducing valve operatively connected to the spool for moving the spool between its open position or closed position, the variable pressure reducing valve being in communication with the supply work port for receiving a signal to command moving the spool between the open position or closed position; wherein, when fluid pressure at the supply work port meets or exceeds a first predetermined pressure setpoint, the non-regenerative mode is activated such that the variable pressure reducing valve receives the signal to command moving the spool toward the open position to allow return work port flow to be discharged from the valve body, which enables closing of the fluid flow path from the bridge passage to the work port supply passage to prevent return work port flow from being supplied to the supply work port; and wherein, when fluid pressure at the supply work port is less than or equal to a second predetermined pressure setpoint, the regenerative mode is activated such that the variable pressure reducing valve receives the signal to command moving the spool toward the closed position to prevent return work port flow from being discharged from the valve body, which enables opening of the fluid flow path from the bridge passage to the work port supply passage to allow return work port flow to be supplied to the supply work port.

According to another aspect of the invention, a hydraulic valve assembly for supplying and receiving pressurized fluid from a fluid operated device is provided, the hydraulic valve assembly being switchable between a regenerative mode and a non-regenerative mode, the hydraulic valve assembly including: a valve body having fluid passages forming a fluid flow path, the fluid passages including: an inlet passage for fluidly connecting to a source of pressurized fluid; a work port supply passage fluidly connected to a supply work port for supplying pressurized fluid to the fluid operated device; a work port return passage fluidly connected to a return work port for receiving pressurized fluid from the fluid operated device; a discharge passage for discharging pressurized fluid from the return passage to outside of the valve body; a first bridge passage for fluidly connecting the inlet passage to the work port supply passage; a second bridge passage for fluidly connecting the work port return passage to the work port supply passage via the first bridge passage in the regenerative mode; and a regenerative shift passage for fluidly connecting the work port return passage to the discharge passage in the non-regenerative mode. The hydraulic valve assembly further including a main control valve extending through at least a portion of the valve body, the main control valve being movable relative to the valve body to control the direction of fluid flow through the valve body; a valve member disposed in the fluid flow path between the regenerative shift passage and the discharge passage, the valve member being movable between an open position for permitting fluid flow from the regenerative shift passage to the discharge passage, and a closed position for preventing fluid flow from the regenerative shift passage to the discharge passage; a first check valve disposed in the first bridge passage between the inlet passage and the work port supply passage; and a second check valve disposed in the second bridge passage between the work port return passage and the first bridge passage; wherein, when the non-regenerative mode is activated, the valve member is moved to the open position to allow return work port flow to be discharged from the valve body, which thereby causes fluid pressure acting on the second check valve to decrease to a level that causes the second check valve to close the flow path between the second bridge passage and the first bridge passage to prevent return work port flow from being supplied to the supply work port; and wherein, when the regenerative mode is activated, the valve member is moved to the closed position to prevent return work port flow from being discharged from the valve body, which thereby causes fluid pressure acting on the second check valve increases to a level that causes the second check valve to open the flow path between the second bridge passage and the first bridge passage to allow return work port flow to be supplied to the supply work port.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

DETAILED DESCRIPTION

The principles of the present invention have particular application to hydraulic systems, and more particularly to hydraulic valve assemblies for extending and retracting at least one hydraulic cylinder in a work machine, such as a skid steer loader, and thus will be described below chiefly in this context. It will be appreciated that principles of this invention may be applicable to other work machines, such as excavators, wheel loaders, loading shovels, backhoes, dozers, and the like, for operating other types of fluid operated devices, such as hydraulic consumers, hydraulic actuators, etc., which may be utilized for controlling other movable functions, such as lifting and/or tilting arms, booms, buckets, and the like.

Figure 1:
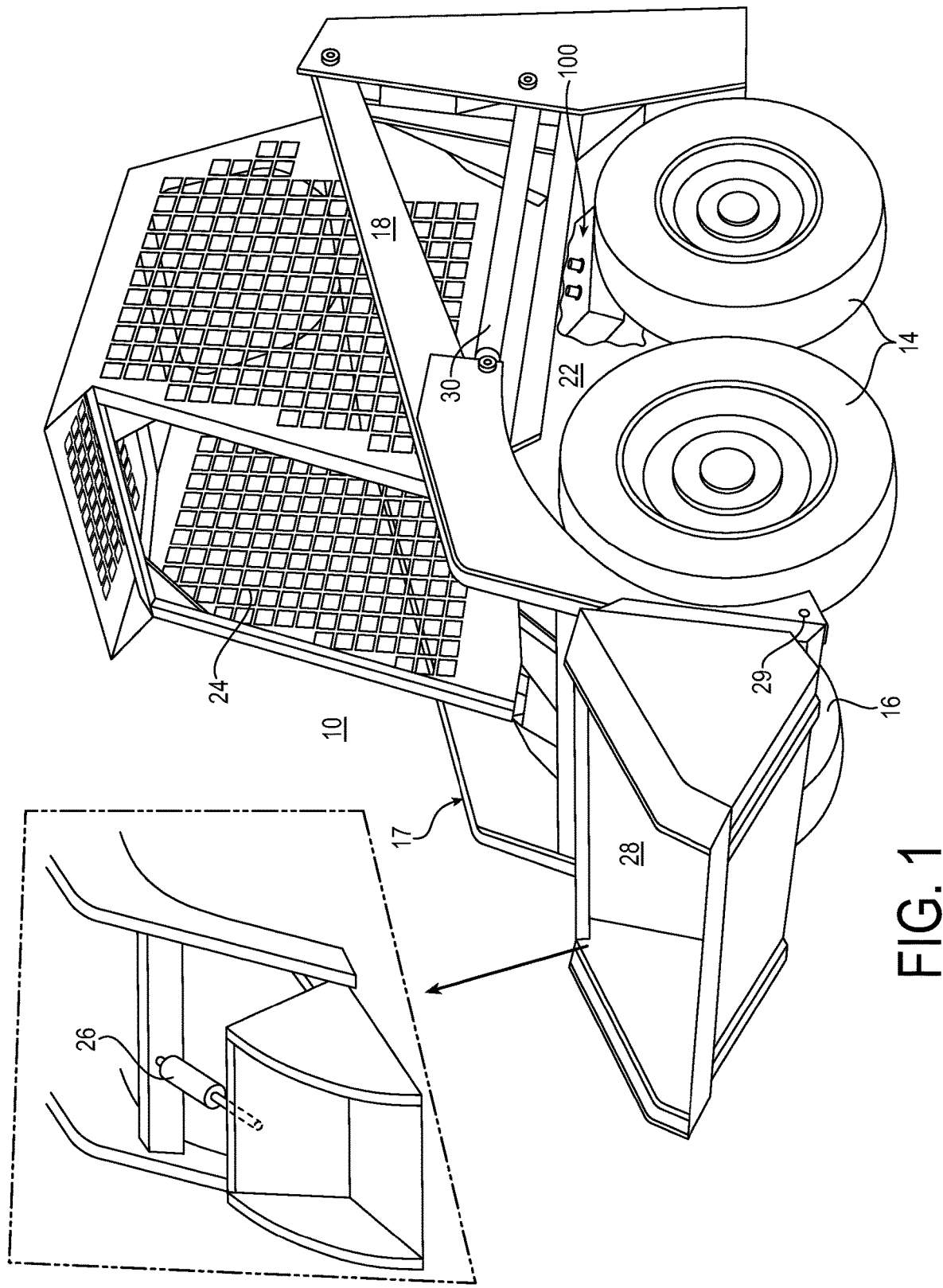
FIG. 1 shows a vehicle that may include an exemplary hydraulic system according to an embodiment of the invention.

Referring to FIG. 1, a hydraulic vehicle 10, known as a skid-steer loader, is shown. The vehicle 10 includes a pair of drive wheels 14 on one side and a pair of drive wheels 16 on the other side. The vehicle 10 is equipped with a movable function, such as a boom assembly 17 having a pair of boom arms 18 pivotally mounted to the rear of a tractor body portion 22 of the vehicle 10. The boom arms 18 extend forwardly along an operator's compartment 24. The boom arms 18 are raised and lowered by fluid operated devices, such as hydraulic cylinders 30 pivotally connected at one end to the body and at an opposite end to a forward portion of the boom arm 18. The boom assembly 17 has mounted at a forward end portion an attachment such as a bucket 28. The bucket 28 is pivotally connected to the boom assembly 17 at respective lower front ends of the boom arms 18 at respective pivotal connections 29, and is pivotable with the movement of hydraulic cylinder 26 (shown in the inset of FIG. 1).

Figure 2A:
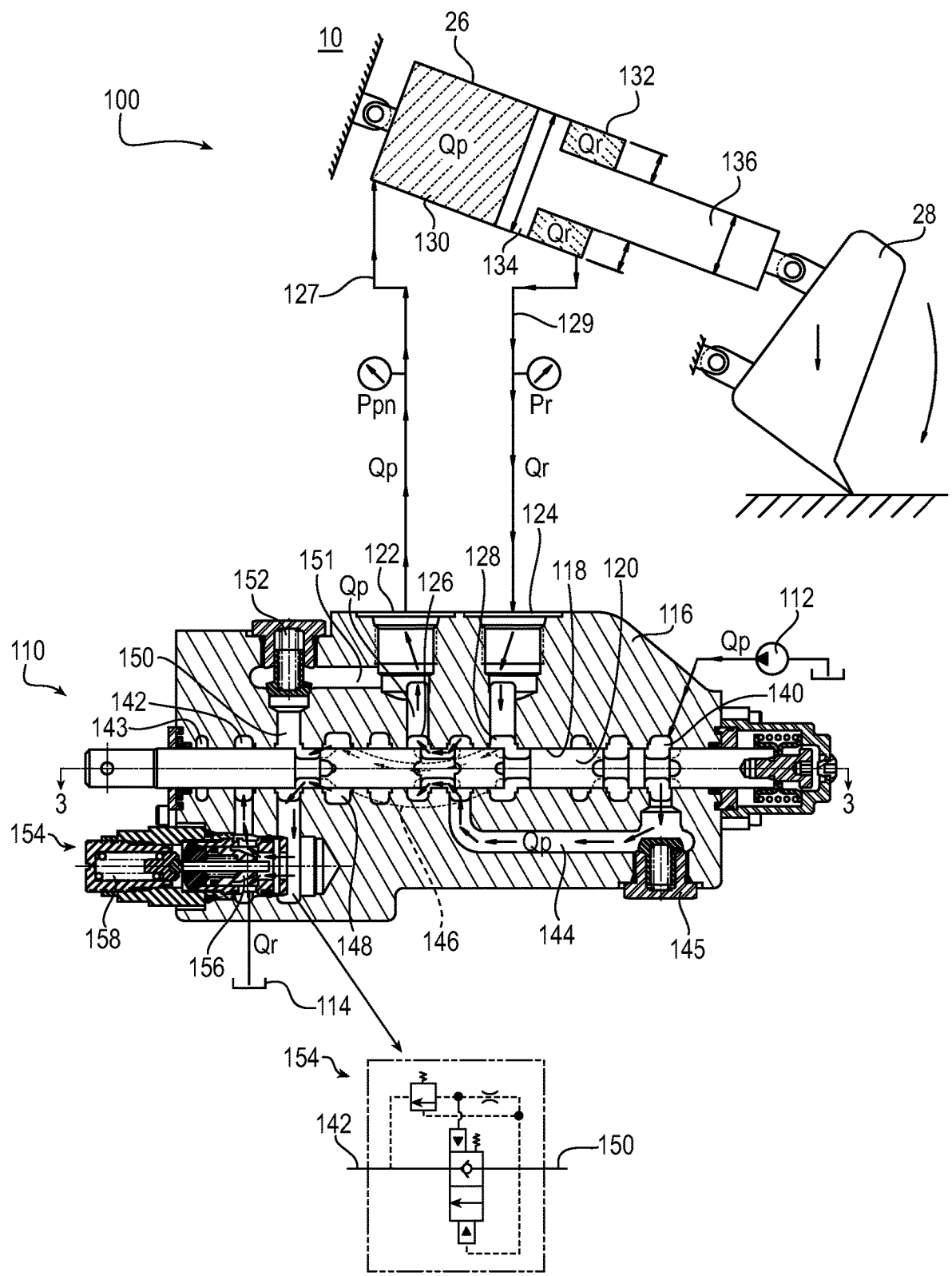
FIG. 2A shows an exemplary hydraulic system including an exemplary hydraulic valve assembly in a non-regenerative mode according to an embodiment of the invention.
Figure 2B:
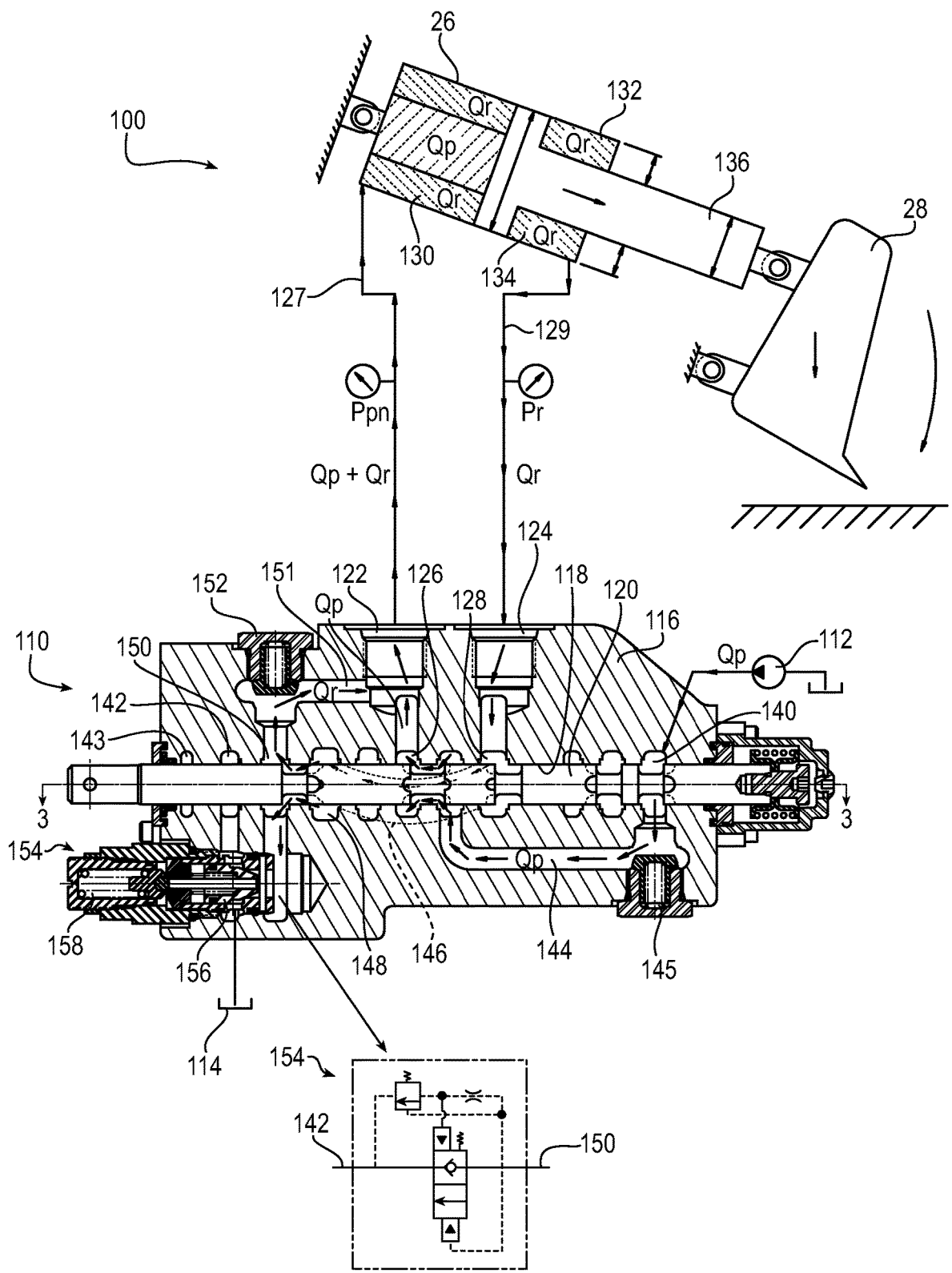
FIG. 2B shows the hydraulic valve assembly in FIG. 2A in a regenerative mode.
Figure 3:
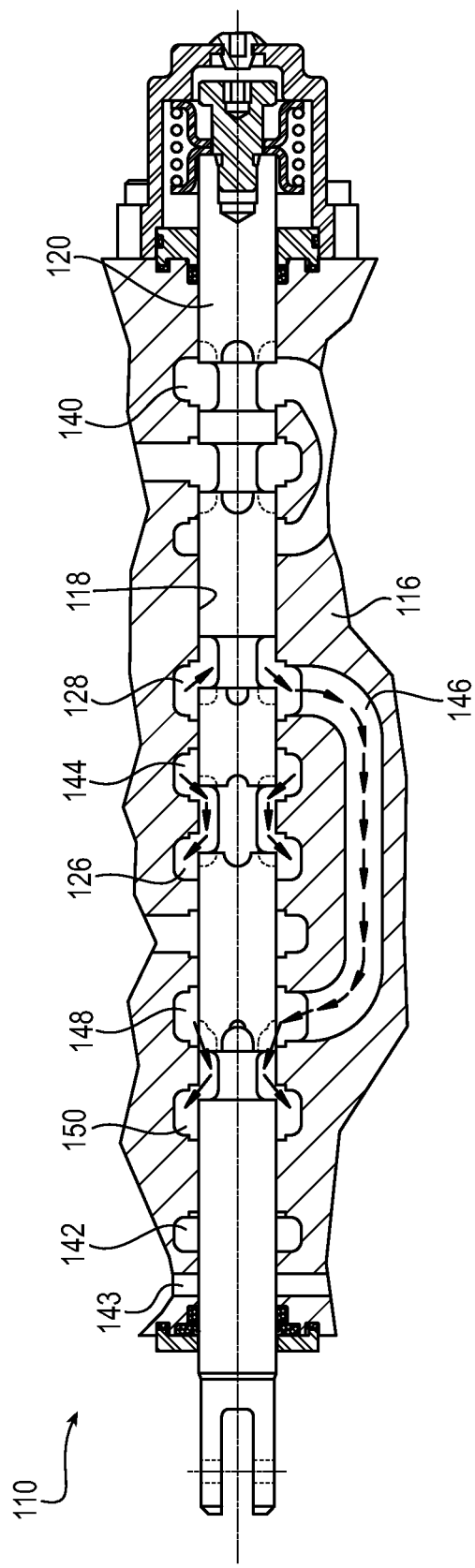
FIG. 3 is a cross-sectional view of the hydraulic valve assembly in FIG. 2A taken about the line 3-3.

Referring also to FIGS. 2A, 2B, and 3, an exemplary hydraulic system 100 is shown, which may form a part of the vehicle 10. The hydraulic system 100 includes an exemplary hydraulic valve assembly 110. The hydraulic valve assembly 110 is configured to control hydraulic fluid flow from a fluid pressure source (such as a pump 112) to the fluid operated device (such as the hydraulic cylinder 26), and to discharge fluid from the fluid pressure source or fluid operated device to a tank or reservoir 114.

In a known manner, the hydraulic valve assembly 110 may form part of a working valve section, which may be coupled together with one or more other working valve sections in a suitable manner to provide an assembly of valve sections for controlling one or more fluid operated devices of a work machine. It is understood that one or more of the worksections in the assembly of valve sections may be the same as one another, or may be different from one another. Those skilled in the art should recognize that any number of the same or different working sections may be included in the assembly of valve sections depending on the system requirements.

The hydraulic valve assembly 110 includes a valve body 116. The valve body 116 includes a spool bore 118, and a plurality of passages, also referred to as cores or cavities, that may open to the spool bore 118. One or more of the plurality fluid passages may extend through the valve body 116 to fluidly connect with other passages, ports, or hydraulic elements disposed in the valve body 116, so as to form a fluid flow path, or fluid circuit, through the valve body 116.

A main control valve, such as a main control spool 120, is slidably disposed in the spool bore 118. Generally, the main control spool 120 is movable between different positions along the spool bore 118 to open and/or close passages that fluidly connect the hydraulic cylinder 26 to the pump 112 and/or the reservoir 114, thereby controlling the direction of fluid flow through the valve body 116.

The valve body 116 includes work ports 122, 124 fluidly connected to the spool bore 118 via respective work port passages 126, 128. In the illustrated state shown in FIGS. 2A and 2B, the main control spool 120 is shifted to a first position that directs fluid from the pump 112 to the work port 122 (via a flow path including work port passage 126, and a conduit 127) to supply fluid to the hydraulic cylinder 26 (as shown with the illustrated flow lines). In such a state, the work port 122 and the passage 126 may be referred to as the supply work port 122 and the work port supply passage 126, respectively. Also as shown, the valve body 116 receives fluid from the hydraulic cylinder 26 via a conduit 129, the work port passage 128, and the work port 124 (as shown with the illustrated flow lines). In this manner, the work port 124 and the passage 128 may be referred to as the return work port 124 and the work port return passage 128, respectively.

It is understood that in the state shown in FIGS. 2A and 2B the cylinder 26 is extending. If the direction of travel of the cylinder 26 were to be reversed to instead retract the cylinder, the main control spool 120 would be shifted to a second position (not shown), in which the flow would be reversed to supply fluid to the hydraulic cylinder 26 via the work port passage 128, the work port 124, and the conduit 129; and return flow would be directed from the cylinder 26 to the valve body 116 via the conduit 127, the work port 122, and the work port passage 126. Therefore, it is understood that the terms "supply" and "return" as used herein refer to an arbitrary frame of reference to facilitate understanding in a particular state of operation, such as during the extension of the hydraulic cylinder, and thus "supply" and "return" may be used interchangeably depending on the state of operation. It is also understood that the description of points along the fluid flow path through the valve body has, by industry conventions, two points: upstream and downstream. As used herein, the term "upstream" refers to the point in the flow path that is closer to the flow source, and the term "downstream" refers to the point closer to the tank or reservoir.

In the illustrated embodiment, the hydraulic cylinder 26 is a single-rod hydraulic cylinder having a piston-end chamber 130 and a rod-end chamber 132 which are separated by a piston 134 having a rod 136. As shown, the supply work port 122 is fluidly connected to the piston-end chamber 130 via the conduit 127, and the return work port 124 is fluidly connected to the rod-end 132 chamber via the conduit 129. Due to the presence of the rod 136 in the rod-end chamber 132, the available hydraulic cross-sectional area of the rod-end chamber 132 is less than the available hydraulic cross-sectional area of the piston-end chamber 130. Accordingly, when the cylinder 26 is extended by supplying fluid to the piston-end chamber 130, more fluid is needed to fill the piston-end chamber 130 than is being discharged from the rod-end chamber 132.

The exemplary hydraulic valve assembly 110 has at least two modes of operation for extending the cylinder 26, a regenerative mode and a non-regenerative mode. With reference to FIG. 2A, an exemplary non-regenerative mode is illustrated. Generally, in the non-regenerative mode, hydraulic fluid flows from the pump 112 into the valve body 116 and is directed by the main control spool 120 to the supply work port 122 for filling the piston-end chamber 130 of cylinder 26. As the piston-end chamber 130 is filled, fluid is drained from the rod-end chamber 132 via conduit 129 and is returned to the valve body 116 via the return work port 124, where the fluid is then discharged to the reservoir 114. In this manner, the fluid flow supplied to piston-end chamber 130 for extending the cylinder 26 is the pump flow (Qp), which enables greater thrusting force, but at reduced speed.

With reference to FIG. 2B, an exemplary regenerative mode is illustrated. Generally, in the regenerative mode, hydraulic fluid flows from the pump 112 into the valve body 116 and is directed by the main control spool 120 to the supply work port 122 for filling the piston-end chamber 130 of cylinder 26. As the piston-end chamber 130 is filled, fluid is drained from the rod-end chamber 132 via conduit 129 and is returned to the valve body 116 via the return port 124. This return fluid is then redirected via passages in the valve body 116 to combine with and supplement the supply fluid flow. In this manner, the fluid flow supplied to the piston-end chamber 130 for extending the cylinder 26 is the combined pump flow (Qp) and the rod-end return flow (Qr), which enables greater speed, but at reduced thrusting force.

Because the non-regenerative mode can push larger loads than the regenerative mode, but the regenerative mode can extend the cylinder at greater speeds than non-regenerative mode, it is desirable to be able to switch between the two modes while the cylinder is extending. For example, consider a skid steer loader that has its arm retracted all the way and its bucket raised away from the ground. If an extend command is given for the bucket, then the first portion of the stroke is performed in the air with gravity assistance, and thus a negative load. If the arm were to hit the ground to push or tamp dirt, the resistive load needed to be pushed by the cylinder would increase significantly. In such a scenario, it may be desirable to start the extension of the stroke in the regenerative mode to go fast, since the load is negative or a small positive value; and at a certain point in the stroke (e.g. tamping the ground), a mode switch to non-regenerative mode may be desirable to enable the cylinder to push the high resistive loads. As described in further detail below, in some embodiments the hydraulic valve assembly enables automatic switching between the regenerative mode and non-regenerative mode, and in other embodiments the switching may be done manually.

In addition to the main control spool, there may be one or more other hydraulic elements, such as pressure control valves, check valves, and the like, that may be utilized in the hydraulic valve assembly to assist with directing fluid flow and controlling fluid pressure in the hydraulic circuit during the regenerative mode or the non-regenerative mode. In addition, the configuration of the fluid passages in the valve body and their interaction with these different hydraulic elements may facilitate the shifting back and forth between the regenerative mode and non-regenerative mode. The various fluid passages and hydraulic elements are described in further detail below according to the illustrated embodiment(s), but it is understood that the orientation of the passages and hydraulic elements may be varied depending on the desired application, as understood by those having skill in the art.

As shown in the illustrated embodiment of FIGS. 2A, 2B, and FIG. 3, in addition to the work port supply passage 126 fluidly connected to the supply work port 122, and the work port return passage 128 fluidly connected to the return work port 124, the valve body 116 also has an inlet passage 140 fluidly connected to the pump 112, and a discharge passage 142 fluidly connected to the reservoir 114. As discussed above, it is understood that the valve assembly 110 may be one or several work sections in an assembly of working valve sections, and so the inlet passage may be fluidly connected to a fluid pressure source, such as the pump, via an adjacent work section on one side of the valve body, and may discharge fluid out of the valve body, such as to the reservoir, via another adjacent work section on an opposite side of the valve body. Filters and fluid temperature transfer components (not shown) may be located between the hydraulic valve assembly 110 and the reservoir 114, which may add pressure drops in the fluid connection from hydraulic valve to reservoir. Adjacent to the discharge passage 142 is a drain passage 143. The drain passage 143 is fluidly connected to a dedicated conduit connecting the hydraulic valve 110 to the external tank and bypassing filters and temperature transfer components. Since the drain passage 143 is separate from the discharge passage 142, the drain passage is not influenced by fluctuations of pressures inside the discharge passage 142, which may be caused by varying flows returning from the cylinder.

A first bridge passage 144 is fluidly connected to the inlet passage 140 and opens to the spool bore 118 between the work port supply passage 126 and the work port return passage 128. A check valve 145 is disposed in the first bridge passage 144 downstream of the inlet passage 140 and upstream of the bridge passage opening to the spool bore 118. When the main spool 120 is in the illustrated position, the bridge passage 144 is fluidly connected to the work port supply passage 126 for supplying fluid from the pump 112 to the supply work port 122.

A second bridge passage 146 (shown in dashed lines in FIGS. 2A and 2B, and also shown in FIG. 3) is fluidly connected to the work port return passage 128 at one end thereof and opens to the spool bore at a second cavity 148 at an opposite end thereof.

The regenerative shift passage 150 opens to the spool bore 118 adjacent to the cavity 148, which enables the regenerative shift passage 150 to fluidly connect with the work port return passage 128 via the bridge passage 146 when the main spool 120 is shifted to the illustrated position. The regenerative shift passage 150 has a first portion extending from the spool bore 118 to fluidly connect with the work port supply passage 126, such as via a transverse portion 151 of the regenerative shift passage. The regenerative shift passage 150 has a second portion extending from the spool bore 118 to fluidly connect with the discharge passage 142. As discussed in further detail below, the first portion of the regenerative shift passage 150 is used during the regenerative mode to combine return work port flow with supply flow, and the second portion of the regenerative shift passage 150 is used during the non-regenerative mode to discharge return work port flow from the valve body.

A check valve 152 is disposed in the flow path between the regenerative shift passage 150 and the work port supply passage 126. In this manner, the check valve 152 has a check valve element exposed to fluid pressure communicated from the return work port 124 (via bridge passage 146 and regenerative shift passage 150) on one side of the check valve element, and is exposed to fluid pressure communicated from the supply work port 122 (via the transverse portion 151 of regenerative shift passage 150) on an opposite side of the check valve element.

A pressure control valve 154 is disposed in the fluid flow path between the regenerative shift passage 150 and the discharge passage 142. The pressure control valve 154 includes a valve element 156 and a biasing device 158, such as a spring. The valve element 156 is exposed to fluid pressure communicated from the return fluid passage 128 on one side of the valve element, and is exposed to fluid pressure communicated from the discharge passage 142 in combination with the biasing force from the biasing device 158 on an opposite side of the valve element. A schematic diagram of the pressure control valve 154 is shown in the inset of FIGS. 2A and 2B. In exemplary embodiments, the pressure control valve may be a pressure control valve having part number 355 9001 115 from Parker-Hannifin Corporation of Cleveland, Ohio.

The pressure control valve 154 may be activated at a predetermined pressure setpoint to open the flow path between the regenerative shift passage 150 and the discharge passage 142, which enables activation of the non-regenerative mode, as discussed below. The predetermined pressure setpoint may be adjustable, such as by adjusting a biasing force from the biasing device 158. For example, when the force from fluid pressure communicated from the return work port 124 is greater than the combined force of fluid pressure from the discharge passage 142 and the force from the biasing device 158, then the pressure control valve 154 is activated to open; and when the force from fluid pressure communicated from the return work port 124 is less than the combined force of fluid pressure from the discharge passage 142 and the biasing force, then the pressure control valve closes the flow path between the regenerative shift passage 150 and the discharge passage 142. As shown in FIG. 2B, the pressure control valve 154 is in fluid pressure communication with the return work port 124, such as via the bridge passage 146, and via the regenerative shift passage 150. In this manner, the pressure control valve 154 is settable to a pressure level that may signal the automatic shift between the non-regenerative mode and the regenerative mode based upon the fluid pressure level at the return work port 124.

An exemplary method of shifting between a regenerative mode (FIG. 2B) and a non-regenerative mode (FIG. 2A) will now be described in further detail. To extend the cylinder 26, the main spool 120 is shifted to enable the work port supply passage 126 to fluidly connect to the bridge passage 144, which is fluidly connected to the inlet passage 140 and pump 112. The pump fluid flows through the inlet passage 140, across the check valve 145 via bridge passage 144, through the work port supply passage 126, and into the piston-end chamber 130, extending the rod 136.

The displaced fluid in the rod-end chamber 132 flows into the return work port 124 and through the work port return passage 128. When the main spool 120 is in the illustrated position, the work port return passage 128 is fluidly connected to the cavity 148 (also referred to as a second work port return cavity) via the second bridge passage 146. The cavity 148 is fluidly connected to the regenerative shift passage 150 via grooves on the outside of the main spool 120.

In the regenerative mode (shown in FIG. 2B), the pressure control valve 154 closes the flow path between regenerative shift passage 150 and the discharge passage 142 because the fluid pressure at the return work port 124 is less than the pressure setting of the pressure control valve 154. With the return flow being blocked from being discharged by the pressure control valve 154, the fluid pressure of the return flow in the first portion of the regenerative shift passage 150 becomes greater than the fluid pressure at the supply work port 122 communicated through the transverse passage 151, thereby causing the check valve 152 to open. In this manner, the return work port flow (Qr) moving through the first portion of the regenerative passage 150 and across check valve 152 combines with the pump fluid flow (Qp). This regenerative combination of fluid flow enables the cylinder 26 to extend fast, but with reduced hydraulic thrust.

Pressure increasing in the piston-end chamber 130 is an indication that the cylinder 26 has encountered resistance (e.g., the ground), and therefore it is desirable to stop moving fast and begin providing full potential hydraulic thrust via the non-regenerative mode (shown in FIG. 2A). When the cylinder 26 meets a resistance, the cylinder 26 will stop or slow down and the return fluid flow from the cylinder will stop or diminish, thereby decreasing return fluid pressure at the return work port 124. Meanwhile, the fluid pressure at the supply work port 122 will increase. When the pressure at the supply work port 122 is greater than the pressure from the return work port 124, the check valve 152 closes and the pressure control valve 154 senses only the return fluid pressure from the return work port 124. When the check valve 152 closes, the fluid pressure from the return work port will begin to increase and reaches a predetermined pressure that activates the pressure control valve 154 to open the flow path from the regenerative shift passage 150 to the discharge passage 142, thereby providing the non-regenerative mode. In the non-regenerative mode the return flow (Qr) does not combine with the pump flow (Qp), allowing only pump flow as the source for extending the cylinder 26 (as shown in FIG. 2A).

When the pressure level on the return side (e.g., at the return work port 124) drops below the pressure setting of the pressure control valve 154, the pressure control valve 154 closes the flow path between regenerative shift passage 150 and the discharge passage 142, thereby causing the check valve 152 to open, and the circuit is now back to the regenerative mode (FIG. 2B). When the cylinder is commanded to retract, the main spool 120 is shifted so that the return work port passage 128 is not fluidly connected to the regenerative shift passage 150, so the pressure control valve 154 does not interact with the cylinder retract force.

Figure 4A:
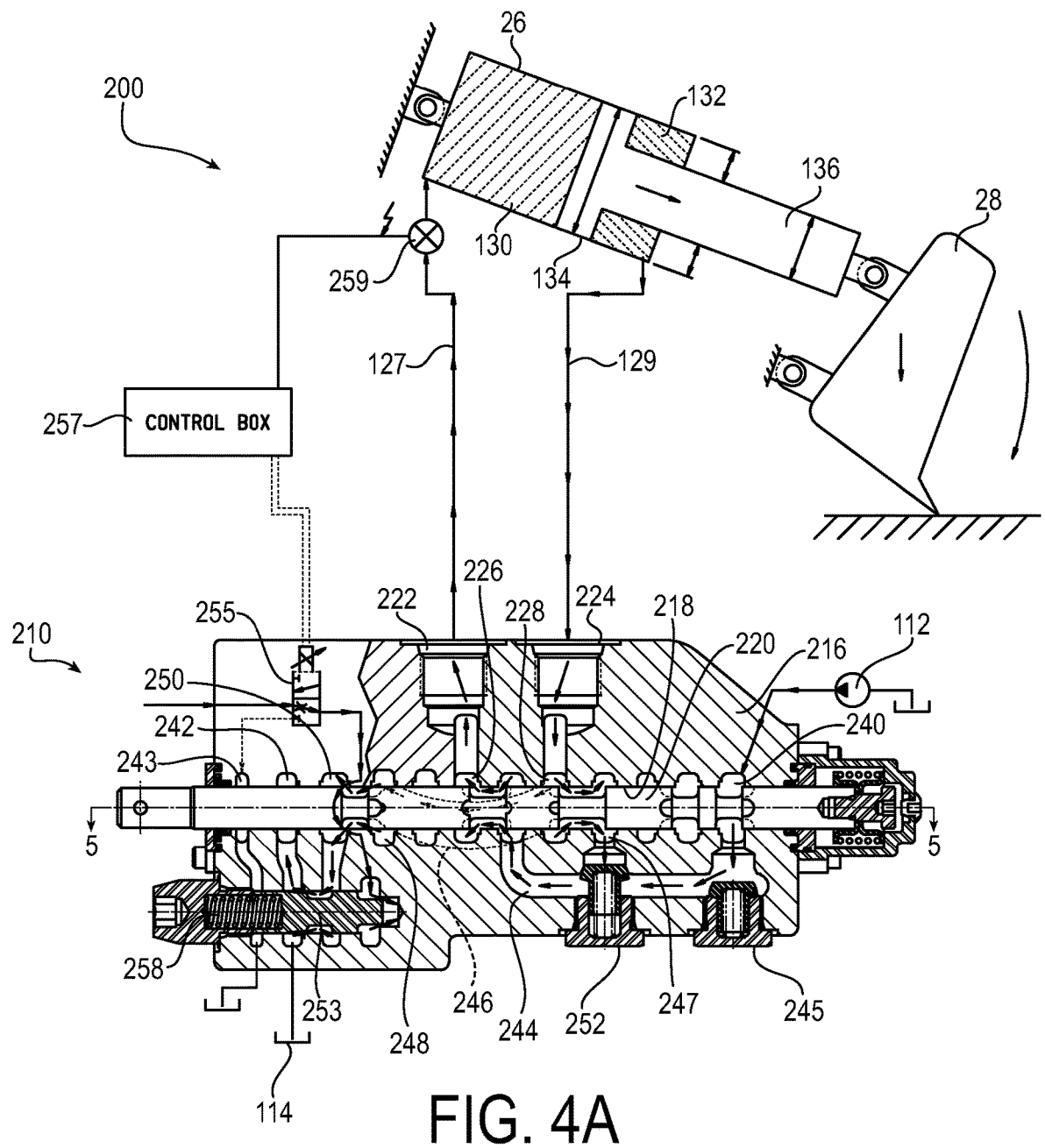
FIG. 4A shows an exemplary hydraulic valve assembly according to another embodiment of the invention in a non-regenerative mode.
Figure 4B:
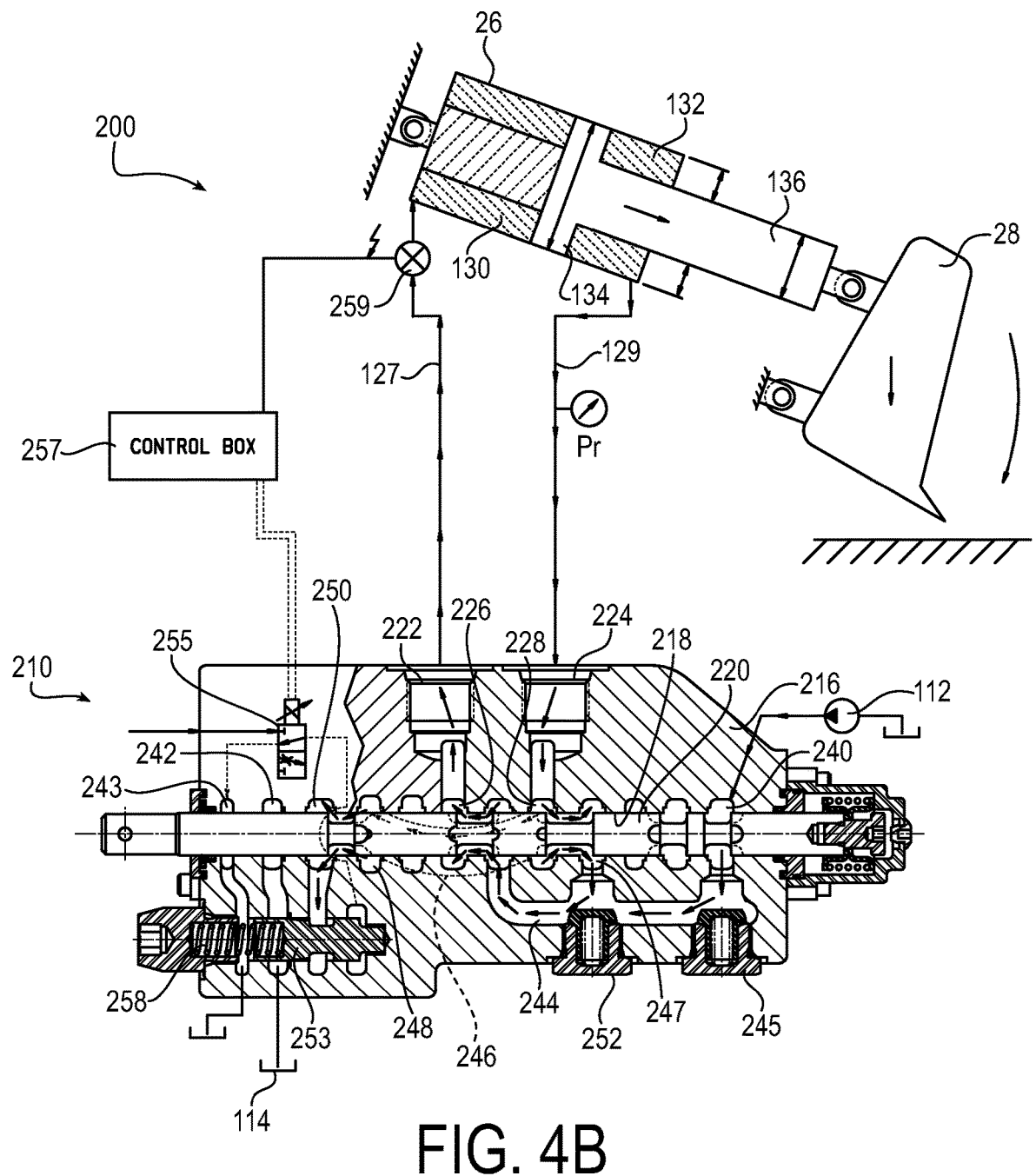
FIG. 4B shows the hydraulic valve assembly in FIG. 4A in a regenerative mode.
Figure 5:
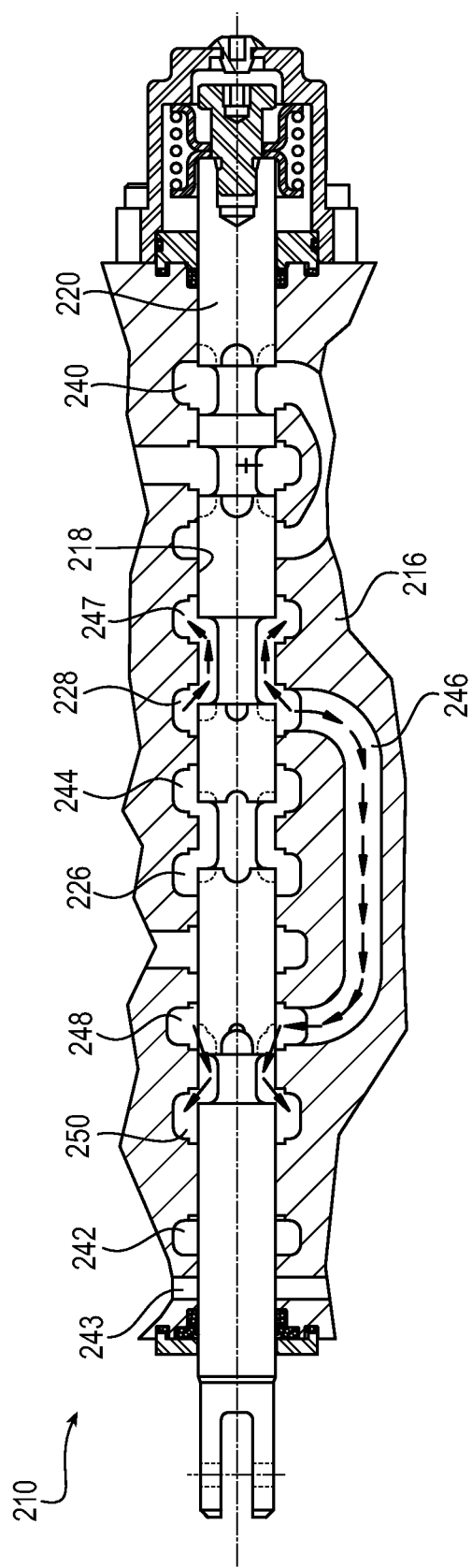
FIG. 5 is a cross-section of the hydraulic valve assembly in FIG. 4A taken about the line 5-5.

Turning now to FIGS. 4A, 4B, and 5, another exemplary embodiment of a hydraulic valve assembly 210 is shown. The hydraulic valve assembly 210 is similar to the above-referenced hydraulic valve assembly 110, and consequently the same reference numerals but indexed by 100 are used to denote structures corresponding to similar structures in the hydraulic valve assemblies 110, 210. In addition, the foregoing description of the hydraulic valve assembly 110 is equally applicable to the hydraulic valve assembly 210 except as noted below. Moreover, it will be appreciated that aspects of the hydraulic valve assemblies 110, 210 may be substituted for one another or used in conjunction with one another where applicable. Generally, the hydraulic valve assembly 210 differs from the hydraulic valve assembly 110 by utilizing a spool actuated by a variable pressure reducing valve for switching between the regenerative and non-regenerative modes, instead of utilizing a pressure control valve.

As shown in the illustrated embodiment, the hydraulic valve assembly 210 includes a valve body 216 having a spool bore 218, and a main control spool 220 slidably disposed in the spool bore. The valve body 216 includes a work port supply passage 226 fluidly connected to a supply work port 222, a work port return passage 228 fluidly connected to a return work port 224, an inlet passage 240 fluidly connected to pump 112, and a discharge passage 242 fluidly connected to reservoir 114. Filters and fluid temperature transfer components (not shown) may be located between the hydraulic valve assembly 210 and reservoir 114, which may add pressure drops in the fluid connection from hydraulic valve to reservoir. Adjacent to the discharge passage 242 is a drain passage 243. The drain passage 243 is fluidly connected to a dedicated conduit connecting the hydraulic valve 210 to the external reservoir and bypassing filters and temperature transfer components. Since the drain passage 243 is separate from the discharge passage 242, the drain passage is not influenced by fluctuations of pressures inside the discharge passage 242, which may be caused by varying flows returning from the cylinder.

A first bridge passage 244 is fluidly connected to the inlet passage 240 and opens to spool bore 218 between the work port supply passage 226 and the work port return passage 228. A check valve 245 is disposed in the first bridge passage 244 downstream of the inlet passage 240 and upstream of the bridge passage opening to the spool bore 218. When the main spool 220 is in the illustrated position, the bridge passage 244 is fluidly connected to the work port supply passage 226 for supplying fluid from the pump 112 to the supply work port 222.

A second bridge passage 247 opens to the spool bore 218 on an opposite side of the work port return passage 228 from where the first bridge passage 244 opens to the spool bore. The second bridge passage 247 is fluidly connected to the first bridge passage 244 at a location upstream from where the first bridge passage 244 opens to the spool bore. When the main spool 220 is in the illustrated position, the work port supply passage 228 is fluidly connected to the second bridge passage 247. A check valve 252 is disposed in the second bridge passage 247 and is configured to open or close the flow path between the second bridge passage 247 and the first bridge passage 244, which may thereby open or close the flow path from the return passage 228 to the supply passage 226 via the first bridge passage 244, as shown.

A third bridge passage 246 (shown in dashed lines in FIGS. 4A and 4B, and also shown in FIG. 5) is fluidly connected to the work port return passage 228 at one end thereof and opens to the spool bore at a second cavity 248 (also referred to as a second work port return cavity) at an opposite end thereof, between the work port supply passage 226 and a regenerative shift passage 250.

The regenerative shift passage 250 opens to the spool bore 218 adjacent to the cavity 248, which enables the regenerative shift passage 250 to fluidly connect with the work port return passage 228 via the bridge passage 246 when the main spool 220 is shifted to the illustrated position. The regenerative shift passage 250 extends from the spool bore 218 to fluidly connect with the discharge passage 242.

A spool 253 is slidably disposed in the fluid flow path between the regenerative shift passage 250 and the discharge passage 242. The spool 253 is movable between an open position (shown in FIG. 4A, for example) for permitting fluid flow from the regenerative shift passage 250 to the discharge passage 242, and a closed position (shown in FIG. 4B, for example) for preventing fluid flow from the regenerative shift passage 250 to the discharge passage 254. A biasing member 258, such as a spring, may be disposed on a first side of the spool 253 for exerting a biasing force that biases the spool toward the closed position.

A variable pressure reducing valve 255 is shown schematically as being operatively connected to the spool 253 (such as via fluid conduits and fluid passages) for moving the spool 253 between its open position or closed position. As shown, the variable pressure reducing valve 255 is operatively connected to a controller 257, such as via an electrical communication line. The controller 257 may be operatively connected to a sensor 259, such as a pressure transducer, that is configured to measure fluid pressure and sends a signal to the controller 257 indicating the measured fluid pressure level. The controller 257 sends the signal to the variable pressure reducing valve 255 to command moving the spool 253 toward the closed position in the regenerative mode, or to command moving the spool 253 toward the open position in the non-regenerative mode. In exemplary embodiments, the sensor 259 is located along the supply flow path, such as in conduit 127 that fluidly connects the supply work port 222 to the piston-end 130 of the cylinder 26. In this manner, the variable pressure reducing valve 255 is considered to be in communication with the supply work port 222 for receiving a signal to command moving the spool 253 between the open position or closed position.

An exemplary method of shifting between a regenerative mode (FIG. 4B) and a non-regenerative mode (FIG. 4A) will now be described in further detail. To extend the cylinder 26, the main spool 220 is shifted to enable the work port supply passage 226 to fluidly connect to the bridge passage 244, which is fluidly connected to the inlet passage 240 and pump 112. The pump fluid flows through the inlet passage 240, across the check valve 245 via bridge passage 244, through the work port supply passage 226, and into the piston-end chamber 130, extending the rod 136.

The displaced fluid in the rod-end chamber 132 flows into the return work port 224 and through the work port return passage 228. When the main spool 220 is in the illustrated position, the work port return passage 228 is fluidly connected to the cavity 248 via the third bridge passage 246. The cavity 248 is fluidly connected to the regenerative shift passage 250 via grooves on the outside of the main spool 220.

When shifting out of the regenerative mode (FIG. 4B) and into the non-regenerative mode (FIG. 4A), the signal to begin the shift may come from the sensor 259 disposed on the supply side. For example, pressure increasing in the piston-end chamber 130 is an indication that the cylinder 26 has encountered resistance (e.g., the ground), and therefore it is desirable to stop moving fast and begin providing greater hydraulic thrust via the non-regenerative mode (FIG. 4A). The electrical signal emitted from the sensor 259 indicates the fluid pressure level, and passes this signal to the controller 257. When the measured fluid pressure in the piston-end chamber 130 reaches or exceeds a predetermined level, the controller 257 sends a ramp-up signal to the variable pressure reducing valve 255. Based upon this ramp-up signal, the variable pressure reducing valve 255 provides a varying pressure to the side of the spool 253 opposite the biasing member 258, where the biasing member 258 is fluidly connected to the drain passage 243. As the varying pressure from the variable pressure reducing valve 255 increases to overcome the biasing force from the biasing member 258, the spool 253 advances proportionally toward the open position in response to the varying command pressure. This advancement allows for a gradual and controlled connection of the regenerative shift passage 250 to the discharge passage 242. This gradual connection is utilized when the connection to the reservoir has started, because the pressure in the flow path on the return side may also begin to decrease, which may also decrease the pressure on the supply side.

As shown in FIG. 4A, when the spool 253 is moved to the open position to allow flow from the regenerative shift passage 250 to the discharge passage 242, the fluid pressure in the return flow path may be reduced. When the fluid pressure in the return flow path (e.g., return work port 224 via the second bridge passage 247) is lower than the fluid pressure in the supply flow path (e.g., supply work port 222 via the first bridge passage 244), the check valve 252 closes, thereby preventing the combination of return flow (Qr) with the pump flow (Qp) and allowing only pump flow as the source for extending the cylinder 26.

As shown in FIG. 4A, when the pressure on the supply side (e.g., at the supply work port 222) drops below a predetermined setpoint (which may be a second predetermined setpoint that is below the predetermined setpoint for shifting into non-regenerative mode), the controller 257 sends a ramp-down signal to the variable pressure reducing valve 255, which proportionally decreases the fluid pressure acting on the spool 253 opposite the biasing member 258, thereby enabling the biasing member 258 to move the spool 253 to the closed position. With the return flow being prevented from being discharged by the spool 253, the return fluid pressure (e.g., return work port 224 via the second bridge passage 247) becomes greater than the fluid pressure in the supply flow path (e.g., supply work port 222 via the first bridge passage 244), thereby causing the check valve 252 to open. In this manner, the regenerative mode is activated such that the return work port flow (Qr) may pass through the second bridge passage 247 and combine with the supply flow (Qp) passing through the first bridge passage 244 to supply fluid to the piston-end chamber 130.

It is noted that in some embodiments, if the pressure changes are done suddenly and the predetermined pressure setpoint for switching to regenerative mode is not lower than the predetermined pressure setpoint for shifting to non-regenerative mode, then the circuit may start to "hunt," which is instability produced when the pressures used to shift into and out of non-regenerative mode are changing rapidly. The gradual connection provided by the ramp-up or ramp-down command signal from the controller 257 to the variable pressure reducing valve 255 in cooperation with the spool 253 may reduce such occurrences of hunting. In exemplary embodiments, the hydraulic valve assembly is switchable between the regenerative mode and the non-regenerative mode independent of a counterbalance valve being used in the flow path of the valve body.

Figure 6A:
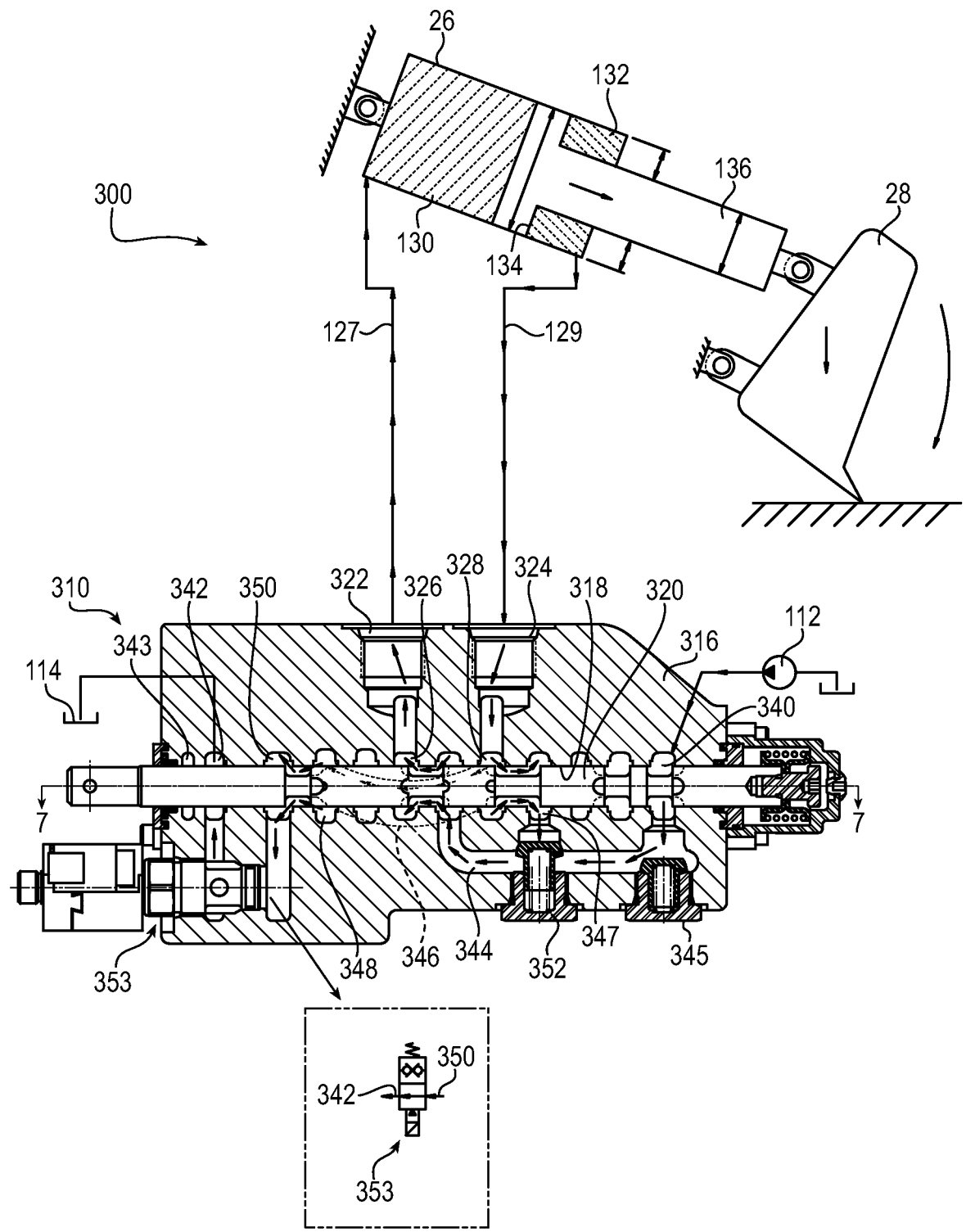
FIG. 6A shows a hydraulic valve assembly according to another embodiment of the invention in a non-regenerative mode.
Figure 6B:
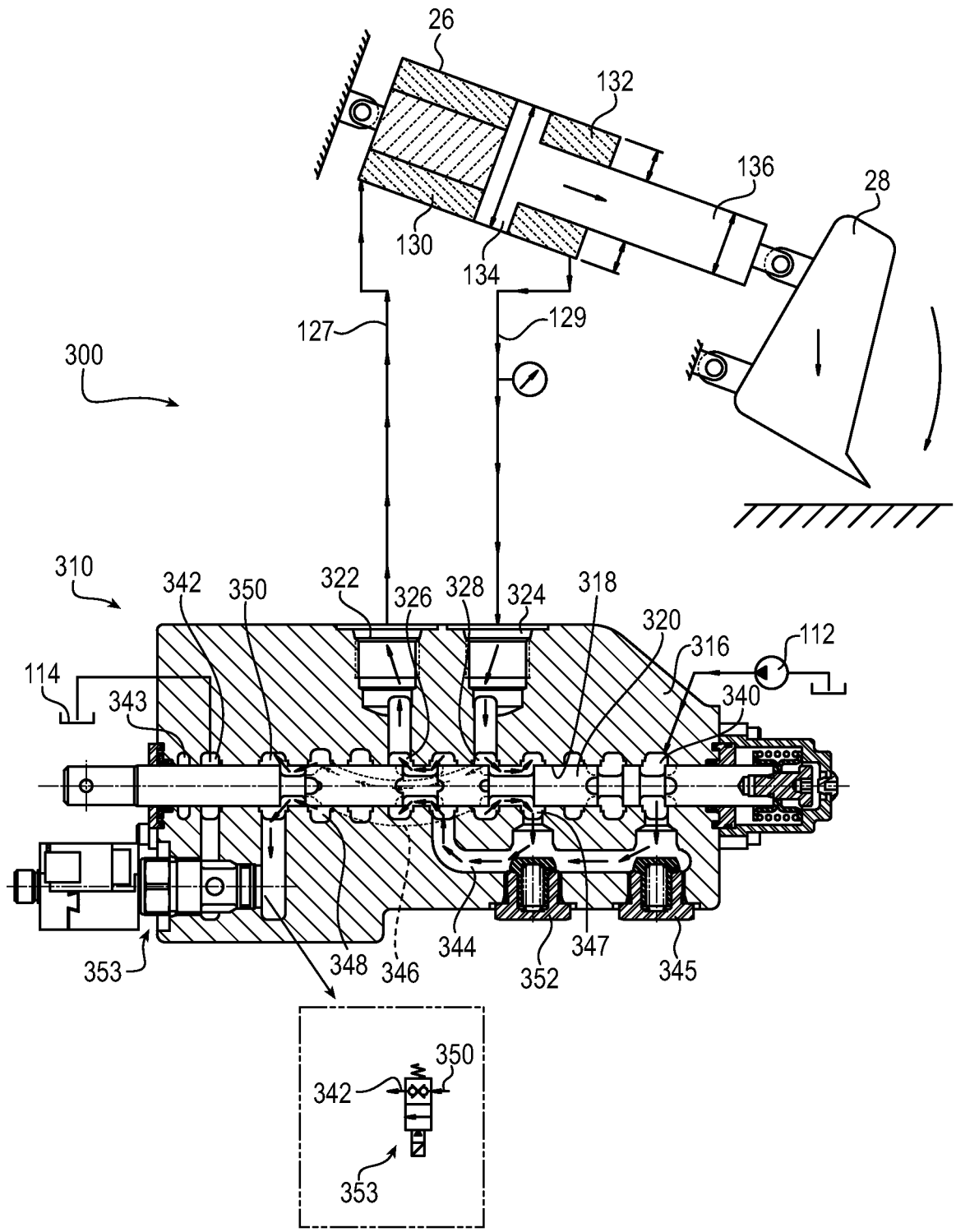
FIG. 6B shows the hydraulic valve assembly in FIG. 6A in a regenerative mode.
Figure 7:
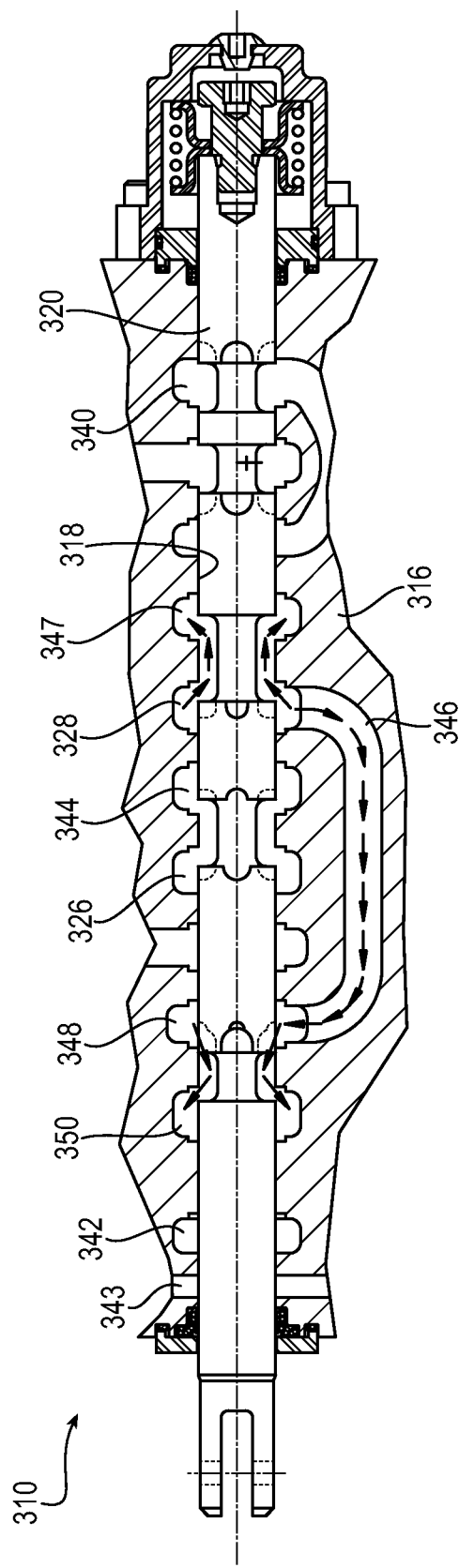
FIG. 7 is a cross-sectional view of the hydraulic valve assembly in FIG. 6A taken about the line 7-7.

Turning now to FIGS. 6A, 6B, and 7, another exemplary embodiment of a hydraulic valve assembly 310 is shown. The hydraulic valve assembly 310 is similar to the above-referenced hydraulic valve assembly 210 and consequently the same reference numerals but indexed by 100 are used to denote structures corresponding to similar structures in the hydraulic valve assemblies 210, 310. In addition, the foregoing description of the hydraulic valve assembly 210 is equally applicable to the hydraulic valve assembly 310 except as noted below. Moreover, it will be appreciated upon reading and understanding the specification that aspects of the hydraulic valve assemblies 210, 310 may be substituted for one another or used in conjunction with one another where applicable. Generally, the hydraulic valve assembly 310 differs from the hydraulic valve assembly 210 by utilizing a valve member that may be actuated by a solenoid for switching between the regenerative and non-regenerative modes, instead of utilizing a spool actuated by a variable pressure reducing valve.

As shown in the illustrated embodiment, the hydraulic valve assembly 310 includes a valve body 316 having a spool bore 318, and a main control spool 320 slidably disposed in the spool bore. The valve body 316 includes a work port supply passage 326, fluidly connected to a supply work port 322, a work port return passage 328 fluidly connected to a return work port 324, an inlet passage 340 fluidly connected to pump 112, and a discharge passage 342 fluidly connected to reservoir 114. Adjacent to the discharge passage 342 is a drain passage 343.

A first bridge passage 344 is fluidly connected to the inlet passage 340 and opens to spool bore 318. A check valve 345 is disposed in the first bridge passage 344. A second bridge passage 347 opens to the spool bore 318. The second bridge passage 347 is fluidly connected to the first bridge passage 344. When the main spool 320 is in the illustrated position, the work port supply passage 328 is fluidly connected to the second bridge passage 347. A check valve 352 is disposed in the second bridge passage 347 and is configured to open or close the flow path between the second bridge passage 347 and the first bridge passage 344. A third bridge passage 346 (shown in dashed lines in FIGS. 6A and 6B, and also shown in FIG. 6) is fluidly connected to the work port return passage 328 at one end thereof and opens to the spool bore at a second cavity 348 (also referred to as a second work port return cavity) at an opposite end thereof, between the work port supply passage 326 and a regenerative shift passage 350. The regenerative shift passage 350 opens to the spool bore 318 adjacent to the cavity 348, which enables the regenerative shift passage 350 to fluidly connect with the work port return passage 328 via the bridge passage 346 when the main spool 320 is shifted to the illustrated position. The regenerative shift passage 350 fluidly connects with the discharge passage 342.

A valve member 353 is slidably disposed in the fluid flow path between the regenerative shift passage 350 and the discharge passage 342. The valve member 353 is movable between an open position (shown in FIG. 6A, for example) for permitting fluid flow from the regenerative shift passage 350 to the discharge passage 342, and a closed position (shown in FIG. 6B, for example) for preventing fluid flow from the regenerative shift passage 350 to the discharge passage 354. The valve member 353 may be a two-way valve biased toward the closed position with a biasing member, such as a spring. The valve member 353 may be operatively coupled to a solenoid for moving the valve member 353 between the open position and closed position. The solenoid may be an on-off solenoid configured to receive a communication signal for commanding the valve member to the open or closed position. The signal may be initiated by a machine operator, or a position switch, or an actuation command. A schematic diagram of the valve member 353 is shown in the inset of FIGS. 6A and 6B.

An exemplary method of shifting between a non-regenerative mode (FIG. 6A) and a regenerative mode (FIG. 6B) will now be described in further detail. To extend the cylinder 26, the main spool 320 is shifted to enable the work port supply passage 326 to fluidly connect to the bridge passage 344, which is fluidly connected to the inlet passage 340 and pump 112. The pump fluid flows through the inlet passage 340, across the check valve 345 via bridge passage 344, through the work port supply passage 326, and into the piston-end chamber 130, extending the rod 136.

The displaced fluid in the rod-end chamber 132 flows into the return work port 324 and through the work port return passage 328. When the main spool 320 is in the illustrated position, the work port return passage 328 is fluidly connected to the cavity 348 via the third bridge passage 346. The cavity 348 is fluidly connected to the regenerative shift passage 350 via grooves on the outside of the main spool 320.

In the regenerative mode (shown in FIG. 6B), the valve member 353 closes the flow path between regenerative shift passage 350 and discharge passage 342 when there is no signal present for actuating the solenoid. In this state, the pump flow (Qp) is connected to the supply work port 322 across the check valve 345 via the first bridge passage 344 to the fill the piston-end chamber 130, extending the rod 136. In addition, the displaced fluid (Qr) being returned from the rod-end chamber 132 flows through the return work port 324, to the bridge passage 347, across check valve 352 and into the bridge passage 344 to combine with the pump fluid (Qp), enabling the cylinder 26 to extend fast, but with reduced hydraulic thrust.

As shown in FIG. 6A, when shifted to the non-regenerative mode, the operator or a position switch commands a signal to the valve element 353, which may be a normally closed two-way valve. This shifts the valve member 353 to the open position and allows flow from the regenerative shift passage 350 to the discharge passage 342. This directs the return flow (Qr) to reservoir 114, lowering the pressure in the flow path from rod-end chamber 132 to the discharge passage 342. With lower pressure in the bridge passage 347, the check valve 352 closes and the connection of the return work port passage 328 to the bridge passage 344 is severed, thereby preventing the combination of return flow (Qr) with the pump flow (Qp) and allowing only pump flow as the source for extending the cylinder 26. In this state, the cylinder may extend, but slower, and with full potential of hydraulic thrust. To return to the regenerative mode, the external signal to the solenoid is terminated and the spring-bias of the valve member 353 closes the flow path from regenerative passage 350 to the discharge passage 342. Without the return fluid being able to flow to the discharge passage 342, it is forced across the check valve 352 in the bridge passage 347 and into the bridge passage 344, thereby combining with the pump fluid and creating a regeneration circuit.

It is noted in the above description of the hydraulic valve assemblies that the regenerative mode may be activated when no signals are received, and shifting to non-regenerative mode may be done when a signal is received. However, it is possible to reverse those states, such as by using hydraulic elements that allow the connection between the regenerative shift passage and the discharge passage to be made when there is no signal.

An exemplary hydraulic valve assembly has been described herein. The hydraulic valve assembly has a regeneration circuit that is switchable between a regenerative mode and a non-regenerative mode as the valve assembly supplies fluid to operate a hydraulic device. Such a hydraulic valve assembly may enable a movable function on a work machine to transition between moving faster, with lower thrusting force, in the regenerative mode, and moving slower, with greater thrusting force, in the non-regenerative mode, all while the movable function is moving in the same direction.

In exemplary embodiments, the hydraulic valve assembly may be automatically switchable between the regenerative mode and the non-regenerative mode, such as by utilizing a pressure control valve in the hydraulic circuit that is activatable at a predetermined pressure setpoint. The pressure control valve may be in fluid communication with a work port, and may be activatable based upon the fluid pressure at the work port. The work port may be fluidly connected to a hydraulic cylinder, and the valve assembly may be switchable between the regenerative and non-regenerative modes during the extension of the cylinder.

In other exemplary embodiments, the hydraulic valve assembly may be automatically switchable between the regenerative and non-regenerative modes by utilizing a variable pressure reducing valve that actuates a spool in the hydraulic circuit. The variable pressure reducing valve may receive a signal from a controller that is in communication with a sensor that measures fluid pressure associated with a work port. Based upon this measured fluid pressure, the variable pressure reducing valve may command moving the spool in the flow path of the regeneration circuit to enable activation of the regenerative mode or the non-regenerative mode.

In still other exemplary embodiments, the hydraulic valve assembly may be manually switchable between the regenerative mode and non-regenerative mode by utilizing a valve member in cooperation with one or more check valves in the regeneration circuit. The valve member may be operatively coupled to a solenoid that can receive a signal from an operator to command moving the valve member in the flow path of the regeneration circuit so as to enable activation of the regenerative mode or the non-regenerative mode.

According to one aspect of the invention, a hydraulic valve assembly for supplying and receiving pressurized fluid from a fluid operated device is provided, the hydraulic valve assembly being switchable between a regenerative mode and a non-regenerative mode, the hydraulic valve assembly including: a valve body having fluid passages forming a fluid flow path, the fluid passages including: an inlet passage for fluidly connecting to a source of pressurized fluid; a work port supply passage fluidly connected to a supply work port for supplying pressurized fluid to the fluid operated device; a work port return passage fluidly connected to a return work port for receiving pressurized fluid from the fluid operated device; a discharge passage for discharging pressurized fluid from the return passage to outside of the valve body; and a regenerative shift passage for fluidly connecting the work port return passage to the work port supply passage in the regenerative mode, and for fluidly connecting the work port return passage to the discharge passage in the non-regenerative mode. The hydraulic valve assembly further including a main control valve extending through at least a portion of the valve body, the main control valve being movable relative to the valve body to control the direction of fluid flow through the valve body; and a pressure control valve disposed in the fluid flow path between the regenerative shift passage and the discharge passage.

Embodiments of the invention may include one or more of the following additional features separately or in combination.

The pressure control valve may be in fluid pressure communication with the return work port, and may be configured to activate at a predetermined pressure setpoint.

When fluid pressure at the return work port is less than the predetermined pressure setpoint, the pressure control valve may activate the regenerative mode, such that the pressure control valve closes the flow path from the regenerative shift passage to the discharge passage to prevent return work port flow from being discharged from the valve body, and enables opening of the fluid flow path from the regenerative shift passage to the work port supply passage to allow return work port flow to be supplied to the supply work port.

When fluid pressure at the return work port meets or exceeds the predetermined pressure setpoint, the pressure control valve may activate the non-regenerative mode, such that the pressure control valve opens the flow path from the regenerative shift passage to the discharge passage to allow return work port flow to be discharged from the valve body to prevent return work port flow from being supplied to the supply work port.

The hydraulic valve assembly may further include a check valve disposed in the flow path between the regenerative shift passage and the work port supply passage.

The pressure control valve may be configured to cooperate with the check valve to activate the regenerative mode, such that, when the pressure control valve, in response to the fluid pressure from the return work port being less than the predetermined pressure setpoint of the pressure control valve, closes the flow path between the regenerative shift passage and the discharge passage, fluid pressure acting on the check valve increases to a level that causes the check valve to open the flow path between the regenerative shift passage and the work port supply passage to allow return work port flow to be supplied to the supply work port.

The pressure control valve may be configured to cooperate with the check valve to activate the non-regenerative mode, such that, when fluid pressure acting on the check valve causes the check valve to close the flow path between the regenerative shift passage and the work port supply passage, the pressure control valve, in response to the fluid pressure from the return work port meeting or exceeding the predetermined pressure setpoint of the pressure control valve, opens the flow path between the regenerative shift passage and the discharge passage.

The check valve may have a check valve element exposed to fluid pressure communicated from the return work port on one side of the check valve element, and may be exposed to fluid pressure communicated from the supply work port on an opposite side of the check valve element.

When the fluid pressure communicated from the return work port is greater than the fluid pressure communicated from the supply work port, the check valve may be activated to open the flow path between the regenerative shift passage and the work port supply passage to allow return work port flow to be supplied to the supply work port.

When the fluid pressure communicated from the return work port is less than the fluid pressure communicated from the supply work port, the check valve may be configured to close the flow path between the regenerative shift passage and the work port supply passage to prevent return work port flow from being supplied to the supply work port.

The pressure control valve may include a biasing device, and the predetermined pressure level of the pressure control valve may be adjustable by adjusting a biasing force of the biasing device.

The pressure control valve may have a valve element exposed to fluid pressure communicated from the return fluid passage on one side of the valve element, and may be exposed to fluid pressure communicated from the discharge passage in combination with the biasing force from the biasing device on an opposite side of the valve element.

When the force from fluid pressure communicated from the return work port is greater than the combined force of fluid pressure from the discharge passage and the biasing force, the pressure control valve may be activated to open the flow path between the regenerative shift passage and the discharge passage to allow return work port flow to be discharged from the valve body.

When the force from fluid pressure communicated from the return work port is less than the combined force of fluid pressure from the discharge passage and the biasing force, the pressure control valve may close the flow path between the regenerative shift passage and the discharge passage to prevent return work port flow from being discharged from the valve body.

The hydraulic valve assembly may be switchable between the regenerative mode and the non-regenerative mode independent of a counterbalance valve being used in the flow path of the valve body.

The valve body may include a spool bore, and the main control valve may be a main control spool slidably movable in the spool bore.

The inlet passage, the work port supply passage, the work port return passage, the regenerative shift passage, and/or the discharge passage may open to the spool bore.

The hydraulic valve assembly may further include a first bridge passage fluidly connected to the inlet passage, the first bridge passage opening to the spool bore between the work port supply passage and the work port return passage.

The hydraulic valve assembly may further include a second check valve disposed in the first bridge passage.

The hydraulic valve assembly may further include a second bridge passage fluidly connected to the work port return passage, the second bridge passage opening to the spool bore between the work port supply passage and the regenerative shift passage.

When the main control valve is in a first position, pressurized fluid may be directed from the inlet passage to the supply work port for operating the fluid operated device in a first direction, and the hydraulic valve assembly may be switchable between the regenerative mode, in which return work port flow supplements flow from the inlet passage to the supply work port, and the non-regenerative mode, in which return work port flow does not supplement flow from the inlet passage to the supply work port.

When the main control valve is in a second position, pressurized fluid may be directed from the inlet passage to the return work port for operating the fluid operated device in a second direction, and the hydraulic valve assembly is not switchable between the regenerative mode and the non-regenerative mode.

The fluid operated device may be a hydraulic actuator having a rod end and a piston end, wherein the supply work port is for fluidly connecting to the piston end, and wherein the return work port is for fluidly connecting to the rod end.

A hydraulic system having the hydraulic valve assembly according to any preceding feature in combination with the fluid operated device and the fluid pressure source.

According to another aspect of the invention, a hydraulic valve assembly for supplying and receiving pressurized fluid from a fluid operated device is provided, the hydraulic valve assembly being switchable between a regenerative mode and a non-regenerative mode, the hydraulic valve assembly including: a valve body having fluid passages forming a fluid flow path, the fluid passages including: an inlet passage for fluidly connecting to a source of pressurized fluid; a work port supply passage fluidly connected to a supply work port for supplying pressurized fluid to the fluid operated device; a work port return passage fluidly connected to a return work port for receiving pressurized fluid from the fluid operated device; a discharge passage for discharging pressurized fluid from the return passage to outside of the valve body; a bridge passage for fluidly connecting the work port return passage to the work port supply passage in the regenerative mode; and a regenerative shift passage for fluidly connecting the work port return passage to the discharge passage in the non-regenerative mode. The hydraulic valve assembly further including a main control valve extending through at least a portion of the valve body, the main control valve being movable relative to the valve body to control the direction of fluid flow through the valve body; a spool slidably disposed in the fluid flow path between the regenerative shift passage and the discharge passage, the spool being movable between an open position for permitting fluid flow from the regenerative shift passage to the discharge passage, and a closed position for preventing fluid flow from the regenerative shift passage to the discharge passage; and a variable pressure reducing valve operatively connected to the spool for moving the spool between its open position or closed position, the variable pressure reducing valve being in communication with the supply work port for receiving a signal to command moving the spool between the open position or closed position.

Embodiments of the invention may include one or more of the following additional features separately or in combination.

When fluid pressure at the supply work port meets or exceeds a first predetermined pressure setpoint, the non-regenerative mode is activated such that the variable pressure reducing valve receives the signal to command moving the spool toward the open position to allow return work port flow to be discharged from the valve body, which enables closing of the fluid flow path from the bridge passage to the work port supply passage to prevent return work port flow from being supplied to the supply work port.

When fluid pressure at the supply work port is less than or equal to a second predetermined pressure setpoint, the regenerative mode is activated such that the variable pressure reducing valve receives the signal to command moving the spool toward the closed position to prevent return work port flow from being discharged from the valve body, which enables opening of the fluid flow path from the bridge passage to the work port supply passage to allow return work port flow to be supplied to the supply work port.

The second predetermined pressure setpoint may be less than the first predetermined pressure setpoint.

The variable pressure reducing valve may be operatively connected to a controller, the controller being operatively connected to a sensor that measures fluid pressure associated with the supply work port.

The controller may send the signal to the variable pressure reducing valve to command moving the spool toward the closed position in the regenerative mode, or may command moving the spool toward the open position in the non-regenerative mode.

A biasing member may be disposed on a first side of the spool for exerting a biasing force that biases the spool toward the closed position.

When the signal is received to command moving the spool toward the open position in the non-regenerative mode, the variable pressure reducing valve may be configured to increase fluid pressure on a second side of the spool opposite the first side for overcoming the biasing force and moving the spool toward the open position.

When the signal is received to command moving the spool toward the closed position in the regenerative mode, the variable pressure reducing valve may be configured to decrease fluid pressure on the second side of the spool for enabling the biasing member to move the spool toward the closed position.

The variable pressure reducing valve may be configured to provide a varying pressure to gradually move the spool between its open position and closed position in proportional response to the varying pressure.

The hydraulic valve assembly may further include a check valve disposed in the bridge passage between the work port return passage and the work port supply passage.

The variable pressure reducing valve in cooperation with the spool may cooperate with the check valve to activate the regenerative mode, such that, when the variable pressure reducing valve commands moving the spool toward the closed position, fluid pressure acting on the check valve increases to a level that causes the check valve to open the flow path between the bridge passage and the work port supply passage to allow return work port flow to be supplied to the supply work port.

The variable pressure reducing valve in cooperation with the spool may cooperate with the check valve to activate the non-regenerative mode, such that, when the variable pressure reducing valve commands moving the spool toward the open position, fluid pressure acting on the check valve decreases to a level that causes the check valve to close the flow path between the bridge passage and the work port supply passage to prevent return work port flow from being supplied to the supply work port.

The valve body may include a spool bore, and the main control valve may be a main control spool slidably movable in the spool bore.

The inlet passage, the work port supply passage, the work port return passage, the regenerative shift passage, the bridge passage, and/or the discharge passage may open to the spool bore.

The bridge passage may be a second bridge passage, the hydraulic valve assembly may further include a first bridge passage fluidly connected to the inlet passage, the first bridge passage opening to the spool bore between the work port supply passage and the work port return passage.

The second bridge passage may open to the spool bore on an opposite side of the work port return passage from where the first bridge passage opens to the spool bore.

The second bridge passage may be fluidly connected to the first bridge passage at a location upstream from where the first bridge passage opens to the spool bore.

The hydraulic valve assembly may further include a second check valve disposed in the first bridge passage.

The hydraulic valve assembly may further include a third bridge passage fluidly connected to the work port return passage, the second bridge passage opening to the spool bore between the work port supply passage and the regenerative shift passage.

When the main control valve is in a first position, pressurized fluid may be directed from the inlet passage to the supply work port for operating the fluid operated device in a first direction, and the hydraulic valve assembly may be switchable between the regenerative mode, in which return work port flow supplements flow from the inlet passage to the supply work port, and the non-regenerative mode, in which return work port flow does not supplement flow from the inlet passage to the supply work port.

When the main control valve is in a second position, pressurized fluid may be directed from the inlet passage to the return work port for operating the fluid operated device in a second direction, and the hydraulic valve assembly is not switchable between the regenerative mode and the non-regenerative mode.

The fluid operated device may be a hydraulic actuator having a rod end and a piston end, wherein the supply work port is for fluidly connecting to the piston end, and wherein the return work port is for fluidly connecting to the rod end.

According to another aspect of the invention, a hydraulic valve assembly for supplying and receiving pressurized fluid from a fluid operated device is provided, the hydraulic valve assembly being switchable between a regenerative mode and a non-regenerative mode, the hydraulic valve assembly including: a valve body having fluid passages forming a fluid flow path, the fluid passages including: an inlet passage for fluidly connecting to a source of pressurized fluid; a work port supply passage fluidly connected to a supply work port for supplying pressurized fluid to the fluid operated device; a work port return passage fluidly connected to a return work port for receiving pressurized fluid from the fluid operated device; a discharge passage for discharging pressurized fluid from the return passage to outside of the valve body; a first bridge passage for fluidly connecting the inlet passage to the work port supply passage; a second bridge passage for fluidly connecting the work port return passage to the work port supply passage via the first bridge passage in the regenerative mode; and a regenerative shift passage for fluidly connecting the work port return passage to the discharge passage in the non-regenerative mode. The hydraulic valve assembly further including a main control valve extending through at least a portion of the valve body, the main control valve being movable relative to the valve body to control the direction of fluid flow through the valve body; a valve member disposed in the fluid flow path between the regenerative shift passage and the discharge passage, the valve member being movable between an open position for permitting fluid flow from the regenerative shift passage to the discharge passage, and a closed position for preventing fluid flow from the regenerative shift passage to the discharge passage; a first check valve disposed in the first bridge passage between the inlet passage and the work port supply passage; and a second check valve disposed in the second bridge passage between the work port return passage and the first bridge passage.

Embodiments of the invention may include one or more of the following additional features separately or in combination.

When the non-regenerative mode is activated, the valve member may be moved to the open position to allow return work port flow to be discharged from the valve body, which thereby causes fluid pressure acting on the second check valve to decrease to a level that causes the second check valve to close the flow path between the second bridge passage and the first bridge passage to prevent return work port flow from being supplied to the supply work port.

When the regenerative mode is activated, the valve member may be moved to the closed position to prevent return work port flow from being discharged from the valve body, which thereby causes fluid pressure acting on the second check valve increases to a level that causes the second check valve to open the flow path between the second bridge passage and the first bridge passage to allow return work port flow to be supplied to the supply work port.

The valve member may be a two-way valve biased toward the closed position with a biasing member.

The valve member may be operatively coupled to a solenoid for moving the valve member between the open position and closed position, the solenoid being configured to receive a communication signal for commanding the valve member to the open or closed position.

The valve body may include a spool bore, and the main control valve may be a main control spool slidably movable in the spool bore.

The inlet passage, the work port supply passage, the work port return passage, the regenerative shift passage, the first bridge passage, the second bridge passage, and/or the discharge passage may open to the spool bore.

The first bridge passage may open to the spool bore between the work port supply passage and the work port return passage.

The second bridge passage may open to the spool bore on an opposite side of the work port return passage from where the first bridge passage opens to the spool bore.

The hydraulic valve assembly may further include a third bridge passage fluidly connected to the work port return passage, the second bridge passage opening to the spool bore between the work port supply passage and the regenerative shift passage.

When the main control valve is in a first position, pressurized fluid may be directed from the inlet passage to the supply work port for operating the fluid operated device in a first direction, and the hydraulic valve assembly may be switchable between the regenerative mode, in which return work port flow supplements flow from the inlet passage to the supply work port, and the non-regenerative mode, in which return work port flow does not supplement flow from the inlet passage to the supply work port.

When the main control valve is in a second position, pressurized fluid may be directed from the inlet passage to the return work port for operating the fluid operated device in a second direction, and the hydraulic valve assembly is not switchable between the regenerative mode and the non-regenerative mode.

The fluid operated device may be a hydraulic actuator having a rod end and a piston end, wherein the supply work port is for fluidly connecting to the piston end, and wherein the return work port is for fluidly connecting to the rod end.

The fluid operated device used in conjunction with any of the preceding hydraulic valve assemblies may be a single-rod hydraulic cylinder.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hydraulic valve assembly for supplying and receiving pressurized fluid from a fluid operated device, the hydraulic valve assembly being switchable between a regenerative mode and a non-regenerative mode, the hydraulic valve assembly comprising:
   a valve body having fluid passages forming a fluid flow path, the fluid passages including:
   an inlet passage for fluidly connecting to a source of pressurized fluid;
   a work port supply passage fluidly connected to a supply work port for supplying pressurized fluid to the fluid operated device;
   a work port return passage fluidly connected to a return work port for receiving pressurized fluid from the fluid operated device;
   a discharge passage for discharging pressurized fluid from the return passage to outside of the valve body; and
   a regenerative shift passage for fluidly connecting the work port return passage to the work port supply passage in the regenerative mode, and for fluidly connecting the work port return passage to the discharge passage in the non-regenerative mode;
   a main control valve extending through at least a portion of the valve body, the main control valve being movable relative to the valve body to control the direction of fluid flow through the valve body; and
   a pressure control valve disposed in the fluid flow path between the regenerative shift passage and the discharge passage;
   wherein the pressure control valve is in fluid pressure communication with the return work port, and is configured to operate based on the fluid pressure at the return work port;
   wherein the pressure control valve is configured to activate the regenerative mode in response to fluid pressure at the return work port being less than a predetermined pressure setpoint of the pressure control valve, such that the pressure control valve closes the flow path from the regenerative shift passage to the discharge passage to prevent return work port flow from being discharged from the valve body, and enables opening of the fluid flow path from the regenerative shift passage to the work port supply passage to allow return work port flow to be supplied to the supply work port; and
   wherein the pressure control valve is configured to activate the non-regenerative mode in response to fluid pressure at the return work port meeting or exceeding the predetermined pressure setpoint of the pressure control valve, such that the pressure control valve opens the flow path from the regenerative shift passage to the discharge passage to allow return work port flow to be discharged from the valve body to prevent return work port flow from being supplied to the supply work port.

2. The hydraulic valve assembly according to claim 1, further comprising:
   a check valve disposed in the flow path between the regenerative shift passage and the work port supply passage;
   wherein the pressure control valve is configured to cooperate with the check valve to activate the regenerative mode, such that, when the pressure control valve, in response to the fluid pressure from the return work port being less than the predetermined pressure setpoint of the pressure control valve, closes the flow path between the regenerative shift passage and the discharge passage, fluid pressure acting on the check valve increases to a level that causes the check valve to open the flow path between the regenerative shift passage and the work port supply passage to allow return work port flow to be supplied to the supply work port; and
   wherein the pressure control valve is configured to cooperate with the check valve to activate the non-regenerative mode, such that, when fluid pressure acting on the check valve causes the check valve to close the flow path between the regenerative shift passage and the work port supply passage, the pressure control valve, in response to the fluid pressure from the return work port meeting or exceeding the predetermined pressure setpoint of the pressure control valve, opens the flow path between the regenerative shift passage and the discharge passage.

3. The hydraulic valve assembly according to claim 2, wherein the check valve has a check valve element exposed to fluid pressure communicated from the return work port on one side of the check valve element, and is exposed to fluid pressure communicated from the supply work port on an opposite side of the check valve element;
   wherein, when the fluid pressure communicated from the return work port is greater than the fluid pressure communicated from the supply work port, the check valve is activated to open the flow path between the regenerative shift passage and the work port supply passage to allow return work port flow to be supplied to the supply work port; and
   wherein, when the fluid pressure communicated from the return work port is less than the fluid pressure communicated from the supply work port, the check valve is configured to close the flow path between the regenerative shift passage and the work port supply passage to prevent return work port flow from being supplied to the supply work port.

4. The hydraulic valve assembly according to claim 2, wherein the valve body includes a spool bore, and the main control valve is a main control spool slidably movable in the spool bore,
   the hydraulic valve assembly further including:
   a first bridge passage fluidly connected to the inlet passage, the first bridge passage opening to the spool bore between the work port supply passage and the work port return passage, and
   a second check valve disposed in the first bridge passage.

5. The hydraulic valve assembly according to claim 4, further including a second bridge passage fluidly connected to the work port return passage, the second bridge passage opening to the spool bore between the work port supply passage and the regenerative shift passage.

6. The hydraulic valve assembly according to claim 2, wherein the check valve is spaced apart in the fluid flow path from the pressure control valve.

7. The hydraulic valve assembly according to claim 1, wherein the pressure control valve includes a biasing device, and the predetermined pressure level of the pressure control valve is adjustable by adjusting a biasing force of the biasing device.

8. The hydraulic valve assembly according to claim 1, wherein the pressure control valve has a valve element exposed to fluid pressure communicated from the return fluid passage on one side of the valve element, and is exposed to fluid pressure communicated from the discharge passage in combination with the biasing force from the biasing device on an opposite side of the valve element;
   wherein, when the force from fluid pressure communicated from the return work port is greater than the combined force of fluid pressure from the discharge passage and the biasing force, the pressure control valve is activated to open the flow path between the regenerative shift passage and the discharge passage to allow return work port flow to be discharged from the valve body; and
   wherein, when the force from fluid pressure communicated from the return work port is less than the combined force of fluid pressure from the discharge passage and the biasing force, the pressure control valve closes the flow path between the regenerative shift passage and the discharge passage to prevent return work port flow from being discharged from the valve body.

9. The hydraulic valve assembly according to claim 1, wherein the valve body includes a spool bore, and the main control valve is a main control spool slidably movable in the spool bore.

10. The hydraulic valve assembly according to claim 9, wherein the inlet passage, the work port supply passage, the work port return passage, the regenerative shift passage, and the discharge passage open to the spool bore.

11. The hydraulic valve assembly according to claim 9, further including a first bridge passage fluidly connected to the inlet passage, the first bridge passage opening to the spool bore between the work port supply passage and the work port return passage.

12. The hydraulic valve assembly according to claim 1, wherein, when the main control valve is in a first position, pressurized fluid is directed from the inlet passage to the supply work port for operating the fluid operated device in a first direction, and the hydraulic valve assembly is switchable between the regenerative mode, in which return work port flow supplements flow from the inlet passage to the supply work port, and the non-regenerative mode, in which return work port flow does not supplement flow from the inlet passage to the supply work port; and
   wherein, when the main control valve is in a second position, pressurized fluid is directed from the inlet passage to the return work port for operating the fluid operated device in a second direction, and the hydraulic valve assembly is not switchable between the regenerative mode and the non-regenerative mode.

13. The hydraulic valve assembly according to claim 1, wherein the fluid operated device is hydraulic actuator having a rod end and a piston end, wherein the supply work port is for fluidly connecting to the piston end, and wherein the return work port is for fluidly connecting to the rod end.

14. A hydraulic system having the hydraulic valve assembly according to claim 1 in combination with the fluid operated device and the fluid pressure source.

15. The hydraulic valve assembly according to claim 1, wherein the pressure control valve is configured to activate or deactivate independently of supply work port pressure.

16. The hydraulic valve assembly according to claim 1, wherein the hydraulic valve assembly is configured such that the return work port is in fluid communication with the pressure control valve via a bridge passage, and wherein return work port flow in the bridge passage is separated from supply work port flow by the main control valve.

* * * * *